US011945703B2

(12) United States Patent
Taylor et al.

(10) Patent No.: US 11,945,703 B2
(45) Date of Patent: Apr. 2, 2024

(54) INTELLIGENT VEHICLE LIFT WITH CENTER OF GRAVITY SENSOR

(71) Applicant: Vehicle Service Group, LLC, Madison, IN (US)

(72) Inventors: Steven Taylor, Madison, IN (US); Gerry Lauderbaugh, Madison, IN (US)

(73) Assignee: Vehicle Service Group, LLC, Madison, IN (US)

( * ) Notice: Subject to any disclaimer, the term of this patent is extended or adjusted under 35 U.S.C. 154(b) by 634 days.

(21) Appl. No.: 17/259,514

(22) PCT Filed: May 28, 2020

(86) PCT No.: PCT/US2020/034786
§ 371 (c)(1),
(2) Date: Jan. 11, 2021

(87) PCT Pub. No.: WO2020/243218
PCT Pub. Date: Dec. 3, 2020

(65) Prior Publication Data
US 2021/0206610 A1 Jul. 8, 2021

Related U.S. Application Data

(60) Provisional application No. 62/853,433, filed on May 28, 2019.

(51) Int. Cl.
*B66F 17/00* (2006.01)
*B66F 3/46* (2006.01)
*G01G 19/18* (2006.01)

(52) U.S. Cl.
CPC .............. *B66F 17/00* (2013.01); *B66F 3/46* (2013.01); *G01G 19/18* (2013.01)

(58) Field of Classification Search
CPC ............ B66F 17/00; B66F 3/46; G01G 19/18
See application file for complete search history.

(56) References Cited

U.S. PATENT DOCUMENTS

2018/0339890 A1* 11/2018 Perlstein ................... B66F 3/46
2019/0265112 A1* 8/2019 Reed ......................... B60D 1/62

FOREIGN PATENT DOCUMENTS

EP 2708489 A1 3/2014
EP 2754636 A1 7/2014
(Continued)

OTHER PUBLICATIONS

International Search Report and Written Opinion dated Sep. 10, 2020 for International Application No. PCT/US2020/034786, 13 pages.

*Primary Examiner* — Saul Rodriguez
*Assistant Examiner* — Willie W Berry, Jr.
(74) *Attorney, Agent, or Firm* — Frost Brown Todd LLP

(57) ABSTRACT

An assistance system uses cameras and sensors to identify a set of vehicle wheels within a lift area, then virtualizes the position and orientation of the vehicle relative to one or more lift posts. The system also determines a center of gravity for the vehicle and uses that center of gravity and other information associated with the vehicle to determine a position within the lift area at which the vehicle should be positioned. The system may also provide guidance to aid in positioning the vehicle at or near that position. Such guidance may be provided as one or more visual or audio indicators or via a software interface. The system may be integrated with lift arms allowing for automated rotation, extension, and elevation of lift adapters once the vehicle is positioned, and it may use distributed processing to locate relevant objects in captured images used in this calculation.

21 Claims, 15 Drawing Sheets

(56) References Cited

FOREIGN PATENT DOCUMENTS

| EP | 3770104 | A1 | 1/2021 |
| EP | 3770105 | A1 | 1/2021 |
| EP | 3770565 | A1 | 1/2021 |

\* cited by examiner

INTELLIGENT VEHICLE LIFT WITH CENTER OF GRAVITY SENSOR

FIELD

The disclosed technology pertains to a system for automatically positioning a vehicle lift.

BACKGROUND

Lifting vehicles during service can be a time-consuming, labor-intensive, and dangerous process. Vehicle lifts have varying designs and capabilities, including drive-on or in-ground lifts that lift a parked vehicle by raising the parking surface in order to allow access to the underside of the vehicle, as well as frame-engaging lifts that raise a vehicle by contacting structural lifting points on the underside frame of the vehicle, allowing access to the underside of the vehicle and allowing wheels and tires to be removed or serviced.

Since vehicle service often includes removing or inspecting tires and wheels, frame-engaging lifts are a popular option. Two-post lifts are a popular type of frame-engaging lift, generally having a post positioned on each side of a vehicle area, each post having a lifting member that can be vertically raised and lowered along the lift post. To allow for compatibility with a variety of vehicles, lifting members will typically have a number of adjustable features that allow the lifting members to reach and engage with vehicle lift points in a variety of locations on a vehicle within the vehicle area.

For example, many passenger vehicles have a set of four outer lift points located on the vehicle frame below the doors, and many passenger vehicles may have an additional set of four inner lift points located at structural points (e.g., a rigid bracket, arm, or joint of the frame, as opposed to a component of the transmission, engine, exhaust, or suspension) closer to the midline of the vehicle. These lift points may be at different heights and locations to accommodate vehicles of different heights and lengths (e.g., lift points will be spread farther apart on a truck or bus as compared to a compact car, and some trucks or sport utility vehicles may have lift points at a higher elevation than those of a sports car or compact car).

As a result, the process of lifting a vehicle often includes positioning the vehicle within the vehicle area, moving lift arms underneath the vehicle, repeatedly visually verifying the locations of the lift points and relative position of the lifting members, and manually adjusting the lifting members (e.g., by pushing or pulling, or in some cases, by electronic control) until the lifting members contact the lift points, and then slowly raising the lifting members while a spotter visually ensures that engagement with the lift points is maintained and that the vehicle does not shift or settle as it is raised.

This process can be time-consuming (e.g., because of repeated adjustment and visual confirmation), labor-intensive (e.g., it may require one or more visual spotters as well as a lift operator, or may require personnel to lie prone to visually spot or position lifting members under the vehicle at ground level), and dangerous (e.g., miscommunication between visual spotters and controllers may lead to personnel being struck by the vehicle of lift).

What is needed, therefore, is an improved lifting member and a system and method for aiding in the positioning of a vehicle relative to the lifting members of a vehicle lift.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of automatic vehicle lifts. While the disclosed applications of the inventors' technology satisfy a long-felt but unmet need in the art of automatic vehicle lifts, it should be understood that the inventors' technology is not limited to being implemented in the precise manners set forth herein but could be implemented in other manners without undue experimentation by those of ordinary skill in the art in view of this disclosure. Accordingly, the examples set forth herein should be understood as being illustrative only and should not be treated as limiting.

Safety, lift operations, and vehicle repairs may often be improved when the vehicle's center of gravity is positioned over or between the lift arms. In some existing systems this is done based on operator experience and general, generic guidelines. On the other hand, many embodiments of the disclosed invention replace this operator experience and guidelines with actual vehicle measurements, thereby providing a safer, more stable, and centered vehicle on the lift.

I. Exemplary Lift Assistance System

Figure 1:
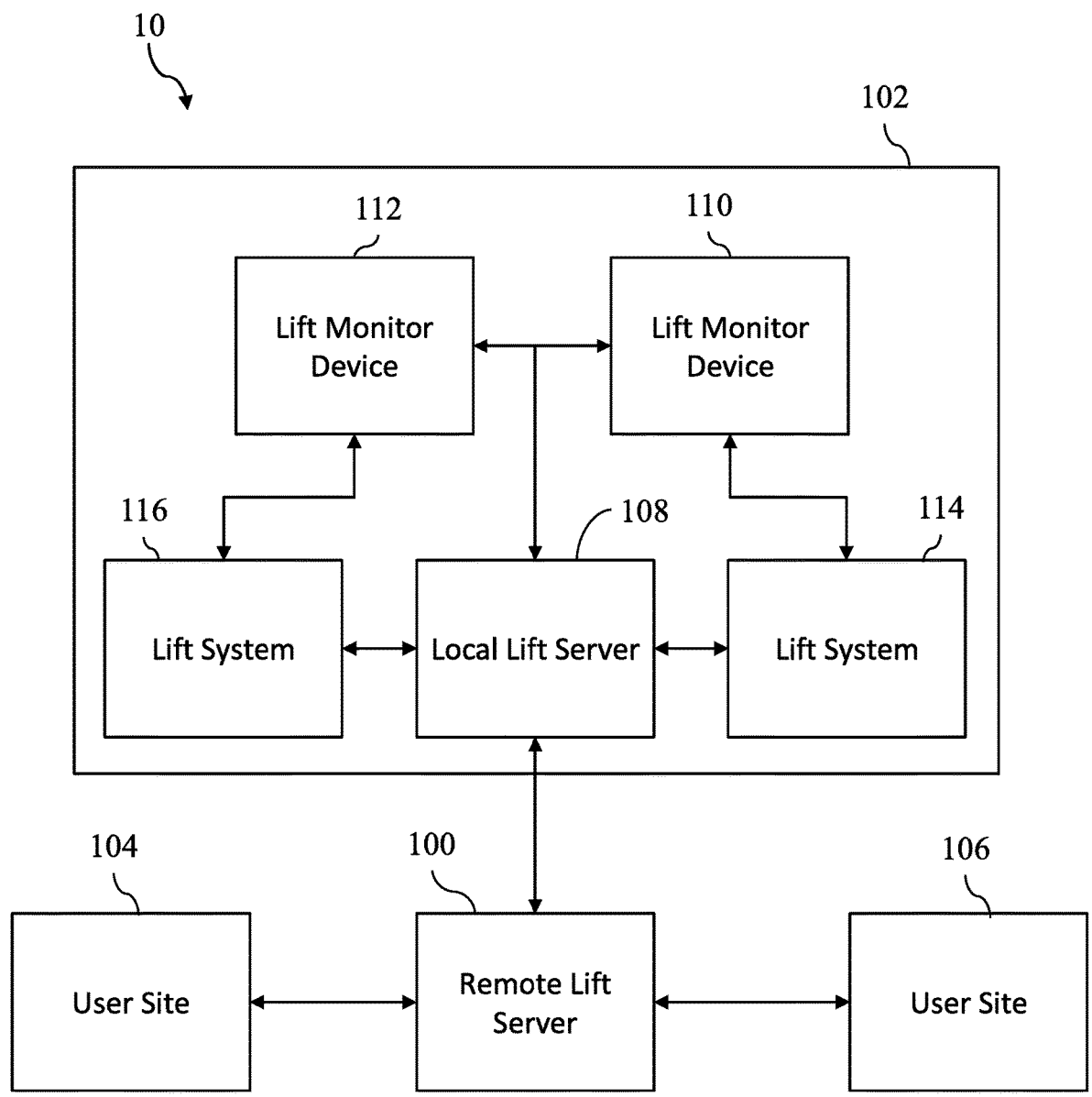
FIG. 1 is a schematic diagram of an exemplary lift assistance system.

Turning now to the figures, FIG. 1 shows a schematic diagram of an exemplary lift assistance system (10). The lift assistance system (10) comprises a remote server (100) that is in communication with one or more user sites (102, 104, 106). A user site, such as the user site (102), may be a user location or installation such as a vehicle service garage capable of servicing one or more vehicles. The user site (102) may comprise one or more lift systems (114, 116), one or more lift monitor devices (110, 112), and a local lift server (108) that is in communication with the remote server (100). A user of the lift assistance system (10) may have one or more user sites such as the user site (102) (e.g., separate buildings each capable of servicing one or more vehicles), or may have a single user site such as the user site (102), or a single user site such as the user site (102) that is spread across separate buildings (e.g., a particular user may have a single local lift server (108) that is in communication with lift systems (114, 116) that are located in different buildings).

The remote server (100) may be one or more physical or virtual servers or server environments capable of storing, processing, and transmitting various types of information via the internet or another network, and may include one or more processors such as a remote lift processor. The remote server (100) stores or is in communication with other servers or databases that are configured to store information related to vehicles and vehicle lifts comprising data in various forms that may be used to aid in the automatic image detection and identification of vehicle wheels, dimensions (e.g., overall length, distance between front wheels, distance between front wheel and rear wheel or wheelbase), and other physical characteristics. The remote server (100) may also store data describing such characteristics of vehicles, and that remote server (100) may be queried, searched, or accessed based upon a vehicle model, VIN number, custom identification number, or other individual or group identifier.

The local lift server (108) may be one or more physical or virtual servers or server environments capable of storing, processing, and transmitting information via the internet or another network, and it may also be in communication with one or more lift systems (114, 116) and one or more lift monitor devices (110, 112). The local lift server (108) may store sets and subsets of information received via the remote server (100) or another device, and it may also provide site performance information to the remote server (100) to allow for the growth and refinement of information relating to the automated identification of vehicle wheels, physical dimensions, or other characteristics. When used herein, "processor" or "controller" may refer to one or more processors, cores, controllers, or computing devices such as the local lift server (108) having a local lift processor, the remote lift server (100) having a remote lift processor, and the lift controller (120), each of which may perform different or distinct tasks or portions of a process, and which may be communicatively coupled to allow the exchange of information during performance of the process. As an example, a processor configured to perform a first, second, and third task may refer to a lift controller (120) having multiple processors or cores that perform the tasks in parallel, or may refer to a processor of the remote lift server (100) performing a first task while a processor of the local lift server (108) performs a second task, or it may refer to a single processor or core running the tasks sequentially. Other such configurations are possible and will be apparent to those of ordinary skill in the art in light of this disclosure.

The lift system (114, 116) may be any of a variety of vehicle lifts that are compatible with and may benefit from automatic positioning of lifting members at vehicle lift points. The lift monitor device (110, 112) may be, for example, a pendant control, a control console, a smartphone, tablet, laptop computer, desktop computer, kiosk device, or other proprietary device capable of displaying information, receiving user inputs, processing and storing information, and communicating with other devices. The lift monitor device (110) is in communication with the lift system (114) and allows a user of the lift monitor device (110) to view information (e.g., textual information describing the lift as well as visual data associated with the lift), interact with, and control the lift system (114), as will be described in more detail below.

Variations on lift assistance system (10) shown in FIG. 1 exist and will be apparent to one of ordinary skill in the art in light of this disclosure. For example, in some implementations, remote server (100) and local lift server (108) may be the same server or environment, or remote server (100) may communicate directly with the lift system (114, 116) and the lift monitor device (110, 112). In some implementations, local lift server (108), lift monitor device (110, 112), or both may be components of (e.g., integrated with or connected in a one-to-one correspondence to) the lift system (114, 116). Further, the user sites (104, 106) may be substantially similar to the user site (102), and each may have one or more lift systems (114, 116).

Figure 2:
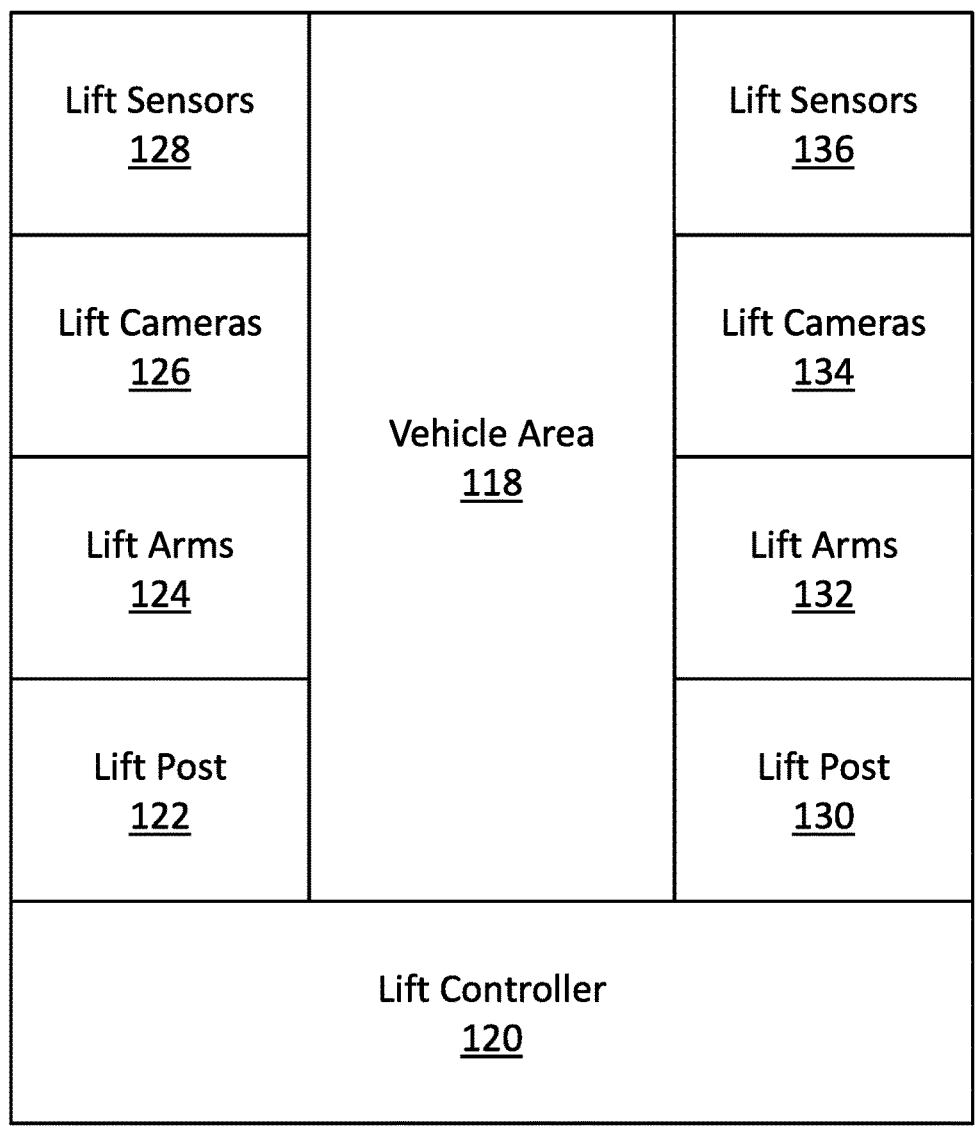
FIG. 2 is a schematic diagram of an exemplary vehicle lift system usable with the lift assistance system.

To provide more information on lift systems, FIG. 2 shows a schematic diagram of an exemplary vehicle lift system, such as the lift system (114), that is usable with the lift assistance system (10). The lift system (114) comprises a vehicle area (118) in which a vehicle may be positioned in order to be interacted with by the lift system (114). While the disclosed technology could function with a variety of vehicle lifts, for the sake of clarity and discussion, this disclosure will focus on use with two-post, frame-engaging vehicle lifts (e.g., lifts having lifting members that contact multiple lift points on a vehicle's frame and lift the vehicle from a resting point in the vehicle area (118)).

A lift controller (120) may be a computing device (e.g., a separate device connected to other components of the lift system (114) or an integrated control system) that is operable to control various aspects of the lift. For example, the lift controller (120) may, based upon user inputs or automatically, provide electronic signals to cause a lift post (122, 130) to raise or lower lift arms or to cause one or more lift arms (124, 132) extending from a lift post to rotate, extend, retract, raise, or lower adapters and cause other mechanical movement by the lift arms (124, 132). The lift controller (120) may also receive information from one or more lift cameras (126, 134) and lift sensors (128, 136), captured from the vehicle area (118), which may be used by one or more of the lift controller (120), the local lift server (108), or the remote server (100) to influence the behavior and performance of the lift assistance system (10), examples of which will be discussed in more detail below. The lift cameras (126, 134) and lift sensors (128, 136) may be collectively referred to herein as lift area detectors or a set of lift area detectors, as they allow the lift controller (120) or other components of the system to detect and receive information on physical characteristics of the vehicle area (118), including for example the physical dimensions of a vehicle and the location and orientation of a vehicle within the vehicle area (118). This may include receiving a set of spatial characteristics that describe the physical dimensions of the lift area.

The lift cameras (126, 134) may be positioned in various locations, including on the lift post (122, 130), and directed at the vehicle area (118) to capture data about or images of a vehicle (e.g., vehicle and wheel size, shape, position) or vehicle area (e.g., the presence of a technician or other person within the vehicle area), on the lift arms (124, 132) and directed at the vehicle area (118) to capture image data from a vehicle (e.g., vehicle wheels), as well as other positions. The lift sensors (128, 136) may be positioned in various locations depending upon the sensor type. As an example, the lift sensors (128, 136) may be positioned on the lift post (122, 130) and directed at the vehicle area (118) to capture data such as proximity of various portions of the vehicle relative to the mounting points of the lift sensors (128, 126). Examples of proximity detection sensors may include lidar, radar, sonar, or other proximity detecting sensors and systems. As another example, the lift sensors (128, 136) may be weight sensors positioned in the lift area or on portions of the lift arms (124, 132) and configured to produce weight information for a vehicle or other load.

As will be apparent to one of ordinary skill in the art in light of this disclosure, variations on the lift system (114) of FIG. 2 can be created. For example, not all implementations will have multiple lift cameras (126, 134) or multiple lift sensors (128, 136), and some implementations may have other devices or sensors performing similar functions. For example, a camera may be configured to act as a proximity sensor, a camera may be configured to detect four-corner vehicle proximity by placement of QR codes or other digital identifiers at corners of the vehicle or on wheels, and wireless triangulation may be used to detect positions of BLUETOOTH or other wireless transceivers placed at corners of the vehicle, on wheels, or on other objects in the system.

As yet another variation, it should be understood that the lift system (114) may have varying types of lifts and lift configurations, as has been described. For example, the lift system (114) may not be a two-post lift having posts such as the lift posts (122, 130), or may be a type of vehicle lift that does not have lift arms such as the lift arms (124, 132). Some implementations of the lift system (114) may instead or additionally include one or more of an in-ground lift that lifts a vehicle by its wheels or by a set of repositionable (e.g., along a single axis parallel to the vehicle) lifting carriages, a set of rolling jacks, a scissor or accordion lift, sets of mobile lift columns (e.g., two or more mobile posts that may position themselves or be rolled into place at lifting points or wheels of a vehicle). In some implementations, one or more of the features of the vehicle lift system (114) may also be applied in other areas where vehicles are stored, lifted, or carried. For example, a towable car carrier that is designed to carry one or more vehicles may have manually or automatically adjustable ramps and vehicle pads that may be operated when loading vehicles for transport. Devices such as the lift sensors (128, 136), lift cameras (126, 134), and lift controller (120) may be combined with such a vehicle carrier and configured to provide one or more of the features or functions described herein, such as aiding in the safe placement of vehicles. In this manner, the sensors (128, 136) and lift cameras (126, 134) may be widely distributed across a plurality of vehicle lifts or related system, and leveraged to gather images and other sensor data through numerous real world uses as a distributed sensor network, which data itself can be used to grow and refine automated processes for identifying vehicles and portions of vehicles.

Figure 3:
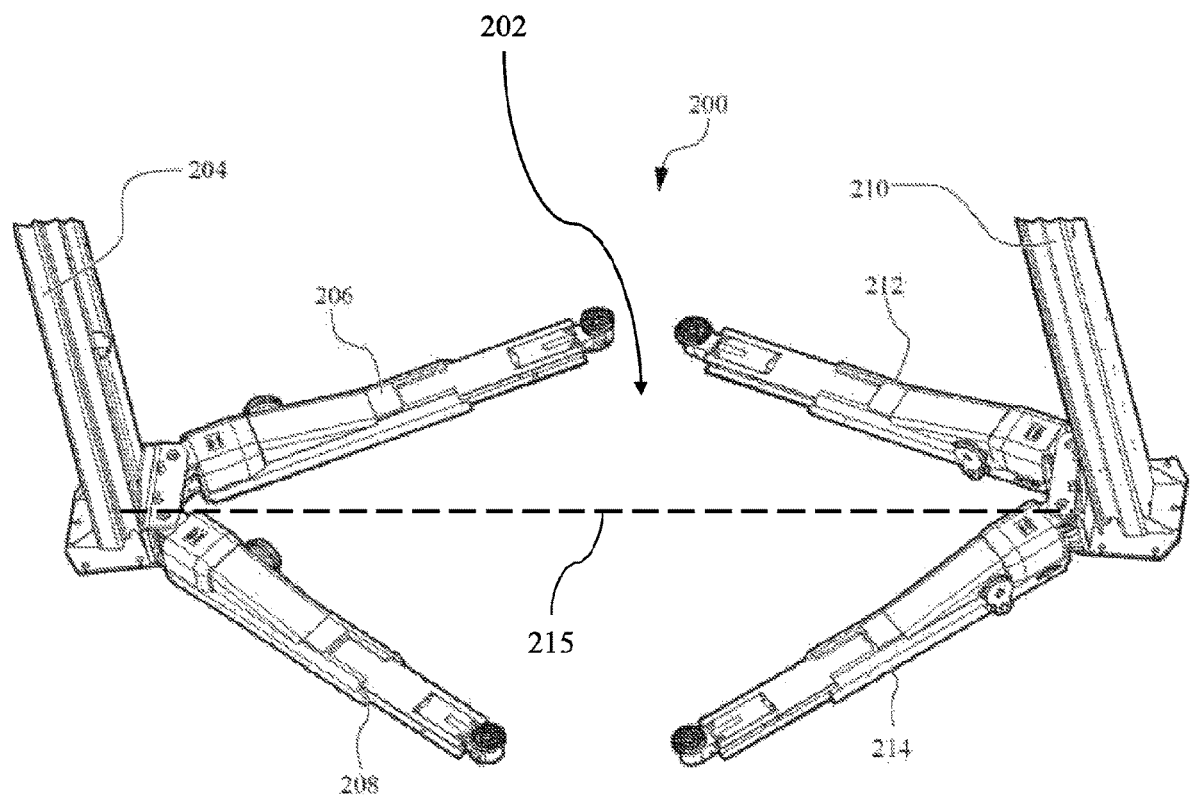
FIG. 3 is a front perspective view of an exemplary vehicle lift usable with the lift assistance system.

As has been discussed, lift systems may also have differing designs and layouts other than the shown two-post lift system (114). For example, other lift systems may have four posts, may be drive-on style lifts, or may have other configurations. To provide more information on one exemplary lift system that may be used with the lift assistance system (10), FIG. 3 shows a front perspective view of an exemplary vehicle lift (200) and an exemplary lift post (204). The vehicle lift (200) comprises a lift post (204) and a lift post (210) positioned on opposite sides of a vehicle area (202). The lift post (204) comprises a lift arm (206) and a lift arm (208), and the lift post (210) comprises a lift arm (212) and a lift arm (214). The lift arms (206, 208, 212, 214) may support varying types of movements, including rotating relative to the lift posts (204, 210) and ascending and descending the lift posts (204, 210), as well as various adjustments to (e.g., extending, retracting, raising, lowering) the lift point adapter, as will be described in more detail below. The vehicle lift (200) may be operated to position each of the lift arms (206, 208, 212, 214) underneath lift points of a vehicle in the vehicle area (202) such that they make contact and engage with the frame of the vehicle, allowing it to be raised to a desired height as the lift arms (206, 208, 212, 214) ascend the lift posts (204, 210).

For the sake of clarity, the respective lift posts (204, 210) and the respective lift arms (206, 208, 212, 214) are each substantially similar to the other(s) in design and function, though some details may be varied (e.g., the lift post (204) may have mirrored portions to reflect that they are located on either side of the vehicle area (202), while the lift arm (206) may be of a different length and may support different retraction and extension lengths than the lift arm (208)) in particular implementations. As such, the lift posts (204, 210) and the lift arms (206, 208, 212, 214) will be discussed interchangeably with a focus on the lift post (204) and the lift arm (206) unless otherwise noted. Further, the lift arms (124, 132, 206, 208, 212, 214), lift posts (122, 130, 204, 210), and other structures usable to engage and lift a vehicle may also be referred to as lift members or, collectively, a set of lift members.

II. Exemplary Method for Positioning Vehicle Based on Center of Gravity

With reference to FIG. 2, a lift arm such as that disclosed above may be operated in numerous ways, including manually by use of a set of input devices present at the lift controller (120), through use of a lift monitor device (110), or with a similar device. Additionally, the disclosed lift arm, and others, may also be operated automatically or semi-automatically based upon data and feedback gathered from sensors and other devices, such as the lift sensors (128), the lift cameras (126), the profile camera (230), and the adapter camera (260). Such automatic or semi-automatic operation may advantageously allow lift arms to be positioned at vehicle lift points more accurately, more quickly, and with a reduced need for visual spotting, repeated adjustment, and prone observation, which can significantly improve the overall safety and efficiency of such procedures.

Whether lift arms are positioned manually, semi-automatically, or automatically, it may be advantageous to determine a vehicle's center of gravity prior to positioning the vehicle within the lift area. Due to extension limits, rotation limits, or other mechanical limitations of a particular lift, poor positioning of a vehicle within the lift area may make manual or automatic positioning lift arms unsafe or impossible. Depending upon a particular type of vehicle lift, the center of gravity of a vehicle may be useful in determining what lift points to use, where to position lift arms relative to the vehicle, and where to position the vehicle within a lift area. While a vehicle's center of gravity is a point in three dimensions (e.g., a point at a particular longitudinal, latitudinal, and vertical coordinate), determining the center of gravity for purposes of vehicle positioning may use only a single dimension/coordinate (e.g., longitudinal center of gravity), or may only use two dimensions/coordinates (e.g., lateral and longitudinal center of gravity).

As an example, with reference to using the longitudinal center of gravity, determining center of gravity may be advantageous because vehicles rarely have a 50/50 front-rear weight distribution, and as a result the vehicle's center of gravity cannot simply be calculated as the longitudinal midpoint of the vehicle. If a vehicle's longitudinal center of gravity can be determined or approximated with some level of accuracy, this can provide a valuable metric or determining vehicle placement that is a safe lift position for use with some vehicle lifts, such as the vehicle lift (200). With reference to FIG. 2, this metric may be used to help position the vehicle such that the safe lift position results in the longitudinal center of gravity resting at or near a midline (215) of each pair of lift arms (e.g., the lift arms (206, 208), and the lift arms (212, 214)) or other set of lift members. Such placement provides a stable position on the lift arms when the vehicle is raised, such that it would require significant additional force or weight applied to the front or rear in order to shift the longitudinal center of gravity to a point where the vehicle would topple forward or backward off the lift arms (206, 208, 212, 214).

As noted, most vehicles do not have a 50/50 front-rear weight distribution. As an example, a front-engine vehicle may have a longitudinal center of gravity offset towards the front of the vehicle, while a rear-engine vehicle may be offset towards the rear of the vehicle. Another difficulty is that a vehicle's weight distribution may not be static, and so a manufacturer-specified characterization of the vehicle's center of gravity may not always be accurate. As an example, pickup trucks, work vans, and other cargo vehicles can have a varying longitudinal center of gravity depending upon equipment, tools, aftermarket features, or other cargo. As yet another example, a vehicle's longitudinal center of gravity can change as a result of a fill level of the gasoline tank at any given time. Some aftermarket modifications can also affect center of gravity, especially performance-related options that may include reducing the overall weight of the vehicle (e.g., removing rear seats, replacing suspension components with aluminum parts) or installing custom engine and exhaust components that may be greater in size or material weight than the original or standard components.

Since center of gravity for a vehicle may not be visually obvious, and may not be static, it may be advantageous to provide a lift system such as the lift assistance system (10) or the lift system (114) that is operable and configured to determine a vehicle center of gravity at the time of lift. Such information may then be used as described above to improve the stability and safety of a vehicle raised by the lift.

Figure 4:
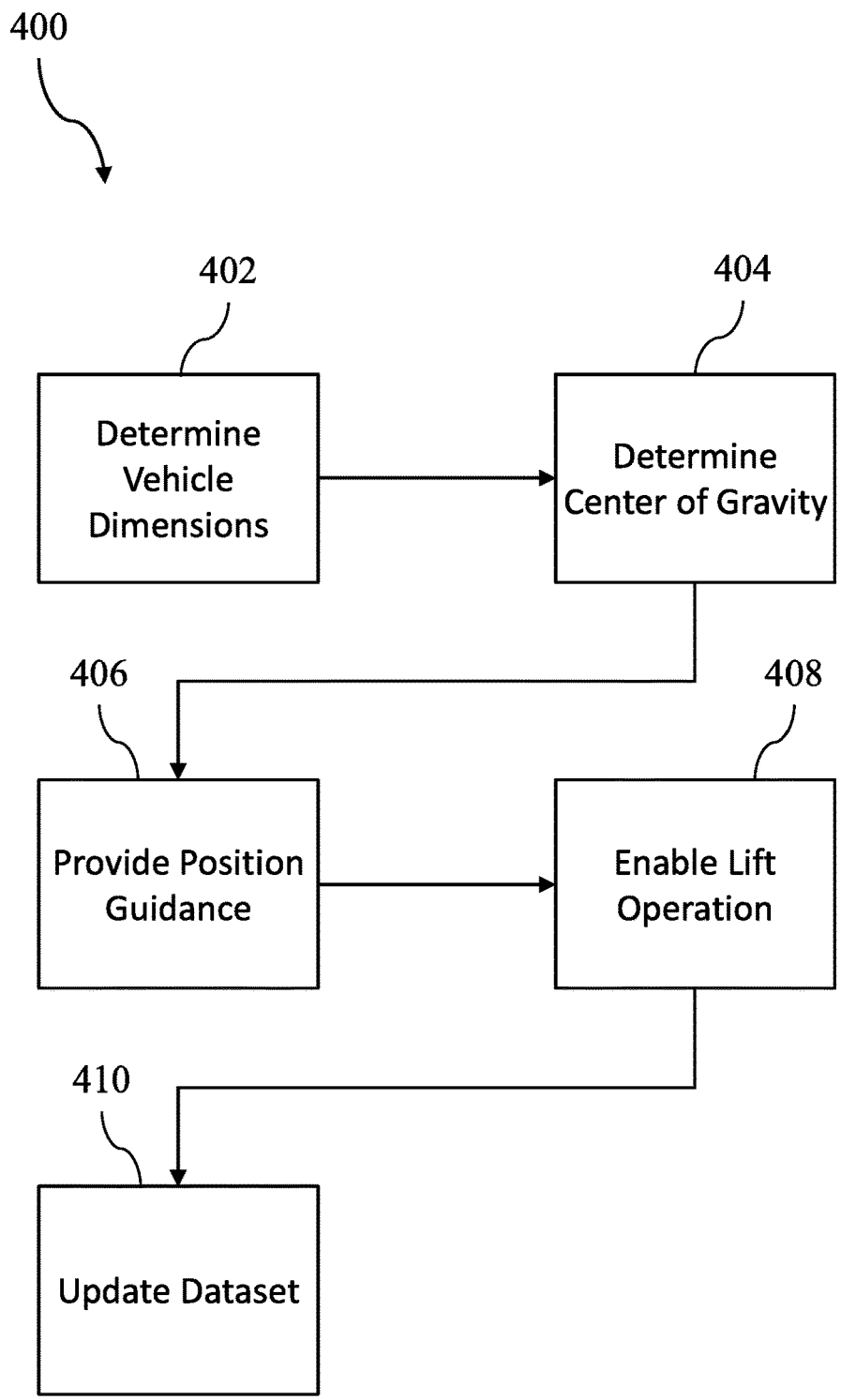
FIG. 4 is a flowchart of an exemplary set of high-level steps that could be performed with the lift assistance system to automatically position a vehicle lift for lifting a vehicle.

Providing positioning assistance may be performed by a system such as the lift assistance system (10), the lift system (114), or both, using methods and processes such as one or more of those described with reference to FIGS. 4, 5, 7, 9, and 12. Turning now to FIG. 4, that figure shows a flowchart of an exemplary set of high-level steps (400) that could be performed by a system such as the lift assistance system (10) to provide vehicle positioning assistance based upon a vehicle's center of gravity. As will be discussed in more detail below, this may include determining (402) the vehicle's dimensions, which may also include determining the vehicle's position with the lift area. Determining (402) the vehicle's dimensions may include one or more of performing a manual measurement, accessing a vehicle dataset to identify the dimensions based upon an accepted specification for that vehicle model or VIN, or automatic measurement using the lift sensors (128, 136), the lift cameras (126, 134), or both.

One or more of the dimensional measurements of the vehicle may be used with weight measurements of the vehicle captured by the lift sensors (128, 136) to determine (404) the vehicle's center of gravity, as will be described in more detail below. With the vehicle's center of gravity and, in some implementations, position within the lift area determined, the system may then provide (406) positioning guidance to aid a technician in positioning the vehicle in a safe position relative to the lift arms in order to provide a stable and safe lift that accounts for the vehicle's dynamically measured center of gravity. An indication of the safe lift position may be in the form of position guidance and may include, for example, visual indicators (e.g., LED lights), audio indicators (e.g., voice guidance), or a graphical interface, as will be described in more detail below. The provided (406) guidance may also include additional safety features such as enabling and disabling lift operation (408) based upon automatic or manual confirmations of positioning relative to the lift arms, and may also include updating (410) a local or remote dataset to incorporate new data (e.g., dimensions or center of gravity for a vehicle model or VIN, manual confirmation of automatically determined dimensions or center of gravity) and improve future vehicle lift operations for that vehicle model or VIN.

As an example, datasets that are maintained or updated may include captured images and image data (e.g., images of wheels or other portions of a vehicle along with information indicating an automatic or manual identification or confirmation of the portion), but may also include information about the dimensions and spatial characteristics of a vehicle, such as a set of proximity data captured by lidar sensors of the lift sensors (128, 136), or a set of weight data captured by in-ground weight sensors (e.g., which may include a weighing surface positioned at ground level and responsive to loads placed thereon to provide weight data) or lift-mounted weight sensors of the lift sensors (128, 136). Such data may be used by the remote server (100) to build datasets describing vehicle length, width, axle track, wheelbase, and other characteristics. Such datasets may be associated with a particular model, year, and type of vehicle, and may augment or replace such specifications provided by the manufacturer or may be associated with a particular vehicle by VIN number or other unique identifier, such as where a vehicle has been modified from its original specification in some way. Data describing the dimensions and other characteristics of types or vehicles or particular vehicles may be useful in the detection and positioning of a vehicle within the vehicle area (202), as will be described in more detail below. While the data gathered from the distributed network of sensors may be useful for automation of lifts, it should be understood that it need not be gathered from a vehicle lift, vehicle carrier, or other structure capable of automation, as the gathering of the sensor data can be performed independently of any automation features.

Figure 5:
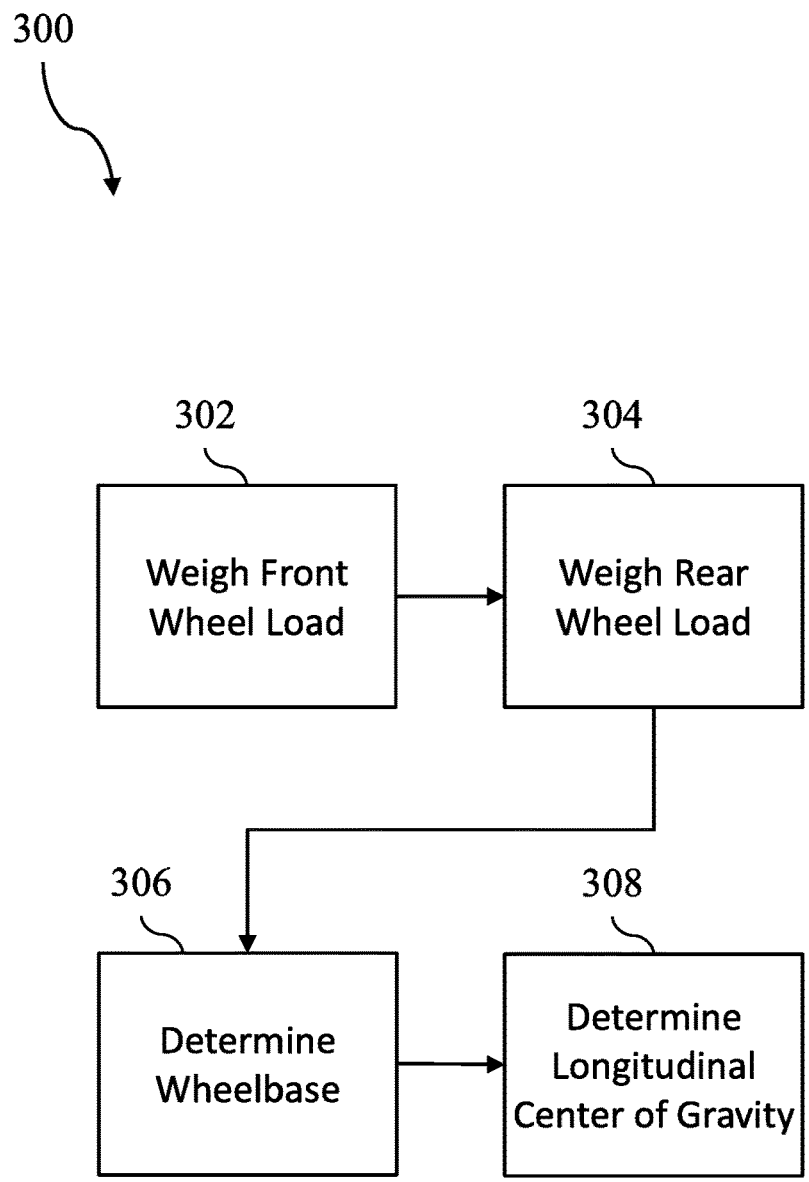
FIG. 5 is a flowchart of an exemplary set of steps that could be performed with the lift assistance system to determine a vehicle's center of gravity.

FIG. 5 shows an exemplary set of steps (300) that could be performed with a system such as the lift assistance system (10) to determine a vehicle's center of gravity. Center of gravity for a vehicle can be determined by performing specific weight measurements of the vehicle, then performing geometric calculations to determine one or more coordinates for the center of gravity (e.g., longitudinal, latitudinal, vertical). While one or more of these coordinates may be useful for various lift systems, longitudinal center of gravity will commonly be useful in safe positioning of a vehicle for lift systems such as that shown in FIG. 3. As an example of measuring longitudinal center of gravity, this may include weighing (302) the front wheel load of a vehicle by placing the front wheels of the vehicle on a weighing surface of a weight sensor and recording the weight, and then weighing (304) the rear wheel load by placing the rear wheels of the vehicle on the same or a different weight sensor and recording the weight, while the vehicle is on a level surface. A wheelbase of the vehicle may then be determined (306) by a manual measurement (e.g., using a tape measure to measure the distance between front and rear wheel axes), or an automatic measurement (e.g., a sensor or image-based automatic identification referred to as determining (402) vehicle dimensions, as will be described in more detail below).

With a front weight measurement, rear weight measurement, and wheelbase measurement, one or more equations can be used to determine (308) the offset of the longitudinal center of gravity from the front and/or rear wheels. As an example, this may include determining a proportion of the front wheel load to the vehicle's total weight, determining an offset of the front wheel based on that proportion and the vehicle wheelbase measurement, and determining the longitudinal center of gravity based on the front wheel offset. As another example, this may include the equation (Front Weight/Total Weight)*Wheelbase Distance, which can be used to determine (308) the distance that the longitudinal center of gravity is offset from the front wheels, while the equation (Rear Weight/Total Weight)*Wheelbase Distance can be used to determine the distance that the longitudinal center of gravity offset from the rear wheels. One or both equations can be used in varying implementations. An example is provided below in Table 1.

TABLE 1

Exemplary Center of Gravity Calculations

Measured Front Weight = 2000 lbs
Measured Rear Weight = 1800 lbs
Measured Wheelbase Distance = 108 inches
Total Weight = (Front Weight + Rear Weight) = 3800 lbs
Front Weight/Total Weight = 2000/3800 = .526
Rear Weight/Total Weight = 1800/3800 = .473
Center of Gravity Offset from Front Wheels = .526 * 108 = 56.8 inches
Center of Gravity Offset from Rear Wheels = .473 * 108 = 51.1 inches Latitudinal center of gravity may be similarly determined by weighing the right wheel load, left wheel load, and track (e.g., the distance between the two front wheels, and the distance between the two rear wheels), and applying a similar equation. As an example, this may include determining a proportion of the right wheel load to the vehicle total weight, determining a lateral (right or left) wheel offset based on the proportion and a vehicle width measurement, and determining the latitudinal center of gravity based on the lateral wheel offset. Vertical center of gravity may be determined by weighing the vehicle front wheels while the rear wheels are raised a static height, weighing the vehicle rear wheels while the front wheels raised a static height, and then applying the Pythagorean Theorem to compare the change in weight from a level measurement to a raised measurement, which indicates the vertical coordinate for the center of gravity.

Figure 6:
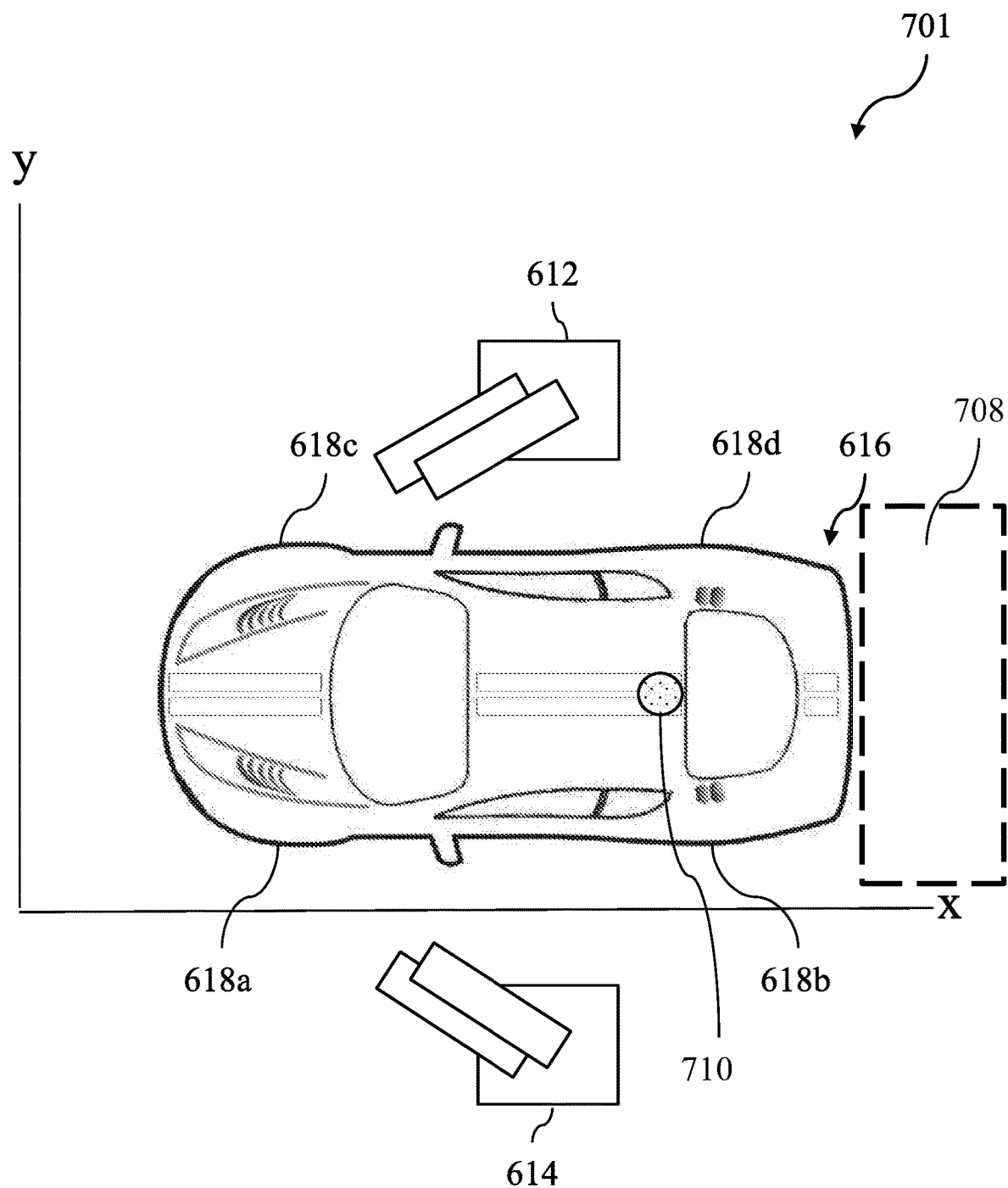
FIG. 6 is a schematic diagram showing a simulated view of the vehicle lift and the vehicle during determination of a center of gravity.

FIG. 6 illustrates a schematic diagram showing a virtualized view (701) of the vehicle lift and the vehicle during determination of a center of gravity as described in FIG. 5. The virtualized view (701) shows a vehicle (616) positioned between a set of lift posts (612, 614) within a vehicle lift area. The lift area includes a weight sensor (708) that the vehicle (616) may be positioned on while being pulled into the lift area to weigh (302) the front wheel load, and then weigh (304) the rear wheel load. The lift area may include lift sensors (128, 136), lift cameras (126, 134), or both, that may be used to identify dimensions of the vehicle, which may include identifying the positions of the wheels (618a, 618b, 618c, 618d), which may be used to determine (306) a wheelbase measurement. A longitudinal center of gravity (710) is shown on the vehicle (616) indicating the determined (308) longitudinal center of gravity offset from the front and rear wheels.

Figure 7:
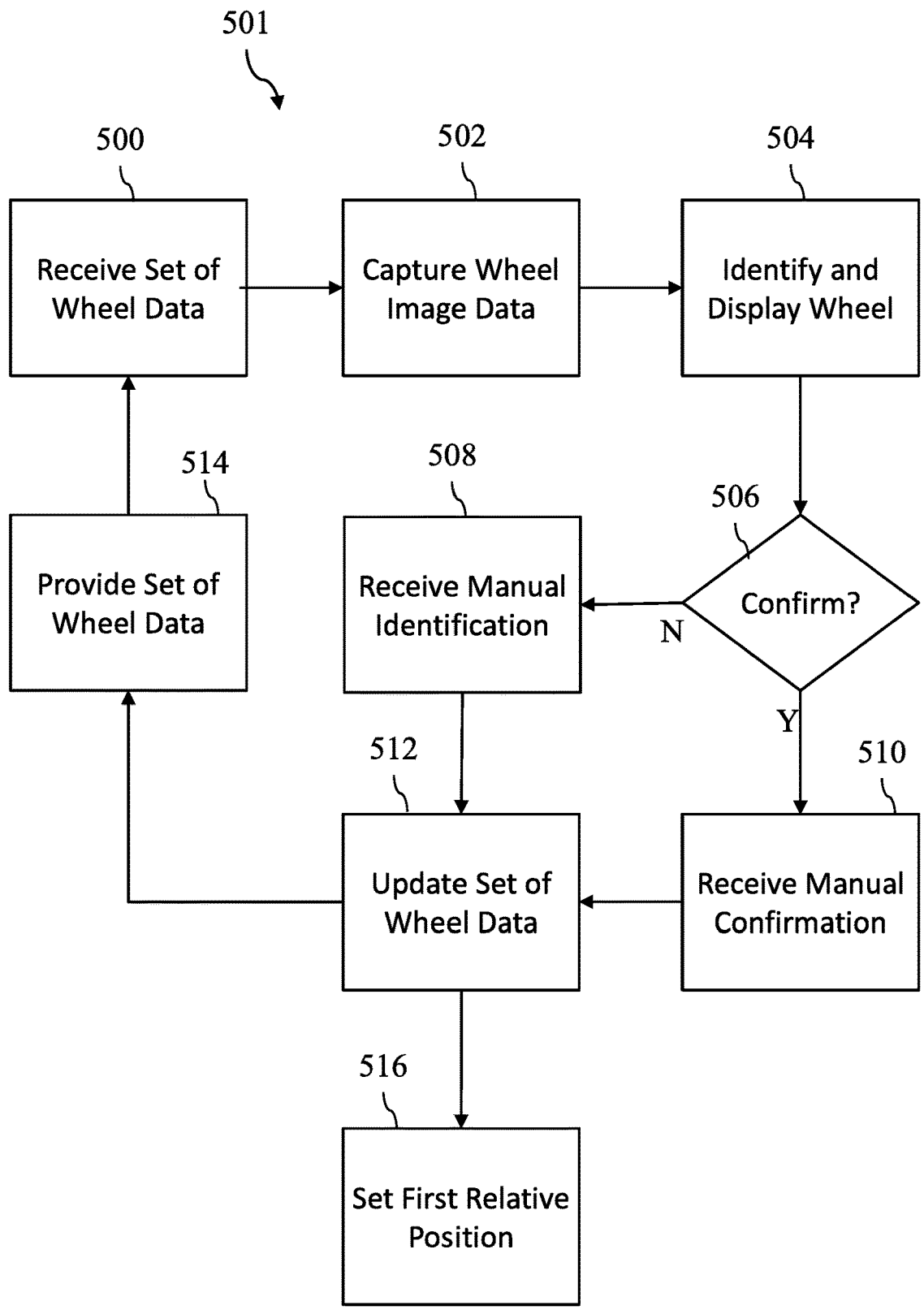
FIG. 7 is a flowchart of an exemplary set of steps that could be performed with the lift assistance system to determine a first relative position of the vehicle to the vehicle lift.

Guided manual vehicle positioning may be influenced by the longitudinal center of gravity (710) by indicating an ideal position for one or more of x-position, y-position, and orientation or rotation within the lift area that accounts for the position of the center of gravity in three-space. While center of gravity may be provided as part of a manufacturer's specification of a vehicle, it can change as a result of fuel levels, cargo (e.g., objects stored in a rear trunk or front footwell), or modifications (e.g., installation of audio equipment, installation of aftermarket performance equipment) as has been described, and so a lift area capable of dynamically determining center of gravity as illustrated by FIG. 7 may advantageously allow for a more accurate center of gravity dataset to be used during guidance of manual positioning. Since center of gravity cannot be accurately visually determined, invisible factors can significantly affect an expected center of gravity and result in unsafe lifting situations.

As has been discussed, determination (402) of vehicle dimensions may include determining various dimensions of the vehicle (e.g., wheelbase, track, length, width, height), determining and virtualizing a position of the vehicle within the lift area, or both. Virtualization may refer to capturing images or other sensor data to determine dimensions and positions of the vehicle within the lift area and associating that data with a three-dimensional coordinate system. The three-dimensional coordinate system may be configured or calibrated to correspond with real-world distances and characteristics of the vehicle area (202). This may include determining and virtualizing the dimensions, position, and orientation of the vehicle, which may include capturing images of the vehicle using the lift cameras (126) and performing image analysis to identify the one or more wheels within the image, and determining an x-direction position of the one or more wheels relative to the lift posts (122, 130). With the position of one or more wheels known, one or more lift sensors (128) may be activated in order to determine a y-direction position of the vehicle relative to the lift posts (122, 130), as well as an angle θ of the vehicle relative to the lift post (122, 130), the combination of all of which can be used to completely virtualize the position of the vehicle within the vehicle area (202).

FIG. 7 shows a flowchart of an exemplary set of steps (501) that could be performed with a system such as the lift assistance system (10) to identify wheels of a vehicle and determine (306) a wheelbase measurement for the vehicle, and that may also be performed to determine a first relative position of the vehicle within the vehicle area (202) where full determination and virtualization of the vehicle within the vehicle area (202) is desirable. The steps (501) may be performed instead of or in addition to other methods of determining the wheelbase, including manual measurement, receiving an accepted specified measurement, or other methods. The local lift server (108) or another device or system (e.g., the lift controller (120) or the lift monitor device (110)) may receive (500) a set of wheel data from the remote server (100), which may comprise software, data, text, images, structural models, sensor data models, artificial intelligence or machine learning (AI/ML) models, and other information that indicate or describe various characteristics of wheels.

The set of wheel data may be, for example, a software application that may be executed to perform image analysis on images in order to identify wheels; may be a set of data usable by image analysis, or AI/ML software to perform the same; or may be information usable to build such a set of data. Such information may include, for example, image sets showing various sizes, colors, positions, and other visual characteristics of wheels, tires, hubcaps, rims, and surrounding areas where wheels are located on a vehicle, from various distances and in various lighting, and may also include sets of metadata associated with the image sets indicating, for each image or for sets of images, the positive identification of a wheel, a location or area of the image indicating the position of the wheel, and the circumstances in which the image was captured (e.g., lighting characteristics, outdoor vs. indoor, type of image capture device, etc.). In some embodiments these source images are included with the resulting model data, while in others the images are omitted.

The set of wheel data may be produced from image sets that include both positive images (e.g., images that have been automatically or manually verified as properly identifying a wheel) as well as negative images (e.g., images that automatically but erroneously identified a wheel, or that manually identified an object that is not a wheel). The set of wheel data may be received (500) and stored locally at the user site (102) from time to time, as the data set will update and improve over time, and as will be described in more detail below. When a vehicle enters the vehicle area (118, 202), the vehicle lift (114, 200) may capture (502) wheel image data from the vehicle in real time (e.g., via devices such as the lift cameras (126), the profile camera (230), or others). The set of wheel data and the captured wheel image data may then be used to identify (504) and display a wheel within the captured wheel image data. This may be accomplished using image analysis and comparison that may, for example, apply abstracted image analysis procedures directly to image data (e.g., in a case where the set of wheel data is a software application or algorithm usable by an application) or may compare various frames of the captured wheel image data to the sets of wheel images within the set of wheel data and, based upon the associated metadata, find visually similar images that suggest the presence or absence of a wheel (e.g., in a case where the set of wheel data comprises images and associated metadata).

When a wheel is identified (504) within the captured image data, the captured image data may be displayed as an image or set of images in near-real-time via a device such as the lift monitor device (110) with an overlaid boundary, box, circle, or other visual indicator identifying the putative location of the wheel within the captured image data. Image data may also include indicators that the wheel is or is not in an acceptable position within the vehicle area (202), which may aid in initial positioning of the vehicle within the vehicle area (202). For example, in some implementations, a user may be driving a vehicle into the vehicle area (202) and may possess the lift monitor device (110), or may be assisted by another user possessing the lift monitor device (110), or may be able to see a display or other visual indicator (e.g., a set of LED lights of various colors, shapes, or configurations) showing the information and/or indicators.

Upon initially positioning the vehicle within the vehicle area (202), the user may view captured image data on the lift monitor device (110). In such implementations, captured image data may be displayed as an image, with a green box indicating an identified wheel that is in a proper position within the vehicle area (202) (e.g., a position where the lift arms are likely to be able to reach and adequately support various lift points under the vehicle), or a red box indicating an identified wheel that is not in a proper position within the vehicle area (202) (e.g., a position where one or more lift arms cannot reach a lift point, or where the vehicle may be unbalanced during lifting). In addition to providing comparisons to particular wheels for identification, metadata associated with the wheel data set may also provide comparisons to those wheels or other wheels in proper positions within the vehicle area (202) that allow for the vehicle to be safely lifted by the vehicle lift (200).

Identification (504) and display of the wheel may also allow a user to provide a confirmation (506) that the identified portion of the captured image data is a wheel. In such implementations, a user may view the identified (504) wheel on the lift monitor device (110) and, where the visual indicator of the wheel is correctly placed, may provide a manual confirmation to be received (510) by the system. This may include, for example, clicking a button or other interface element, tapping the visual indicator on a touchscreen display, or providing other inputs as a confirmation from a user confirming that the vehicle is positioned at the safe lift position and that the safe lift position accounts for the longitudinal center of gravity. Where the visual indicator of the wheel is not correctly placed (e.g., where visual analysis of the captured image data shows that the identified portion of the image is a false positive for wheel location), the user may provide a manual identification of the location of the wheel in the image data to be received (508) by the system. Manual identification may be provided in various ways, including by selecting a circle or box with a mouse or other pointer, by selecting segments of the image that contain portions of the wheel, by dragging the visual indicator using a mouse or touchscreen display to an area within the captured image data that does contain a wheel, or other inputs.

Confirmation (506) may also occur by comparison of the results of automatic wheel detection to a manual measurement of wheelbase, an accepted specified measurement of wheelbase, or a wheelbase measurement determined in a different manner.

In either case, the received (510) manual confirmation or the received (508) manual identification, and the associated captured image data, may be used to update (512) the set of wheel data and provide (514) the updated set of wheel data to the remote server (100), where it can be saved for inclusion in future sets of wheel data that are provided to users of the system or similar systems. Updating (512) may include, for example, providing the results or output of image analysis (e.g., a captured image and an identified portion of the image), and may also include diagnostic and other information related to the performed image analysis. Other processes related to the remote server may include receiving a historic longitudinal center of gravity for a vehicle, comparing the historic value to a currently determined center of gravity, and updating the records on the remote server to describe the current center of gravity. Remote server (100) may update its AI/ML data or subsystem to reflect the received (508) manual identification or received (510) manual confirmation. In this manner and operating over time, the lift assistance system can, based upon user feedback and training in the form of received (510) confirmations and received (508) identifications, refine and improve datasets in order to produce more efficient and accurate automatic identification of wheels within the vehicle area (202) and, thus, more efficient and accurate positioning of the vehicle within the lift area. The provided (514) sets of wheel data may be used for additional purposes beyond identification of wheels, including, for example, identification of lugs nuts on a wheel, inflation levels of wheels, and other characteristics related to the wheel and tire.

With the set of wheels identified and virtualized as described in FIG. 7, the wheelbase may be determined (306) by determining the real-world distance between a front and rear wheel based upon, for example, a relationship between the coordinate system of the lift area virtualization and the real-world dimensions of the lift area. As another example, images captured from a static position may have a per-pixel association with real-world distances configured, such that an image showing the wheels of the vehicle separated by 1200 pixels may correspond to a real-world distance of 120 inches.

As will be apparent to one of ordinary skill in the art in light of this disclosure, steps such as those described above may be implemented and performed in various ways. For example, while FIG. 7 describes an implementation where the user site (102) locally stores the set of wheel data and locally performs image analysis and identification of wheels with a device such as the local lift server (108), lift controller (120), or lift monitor device (110), such steps may also be performed by the remote server (100). Each scenario provides advantages, as storing and processing data locally allows such a system to operate offline or with limited connectivity with the remote server (100), while storing and processing data at the remote server (100) allows for improved image analysis datasets to be created and applied more immediately. As another example, in some scenarios the user site (102) may have image analysis software that downloads and locally stores the set of wheel data to use for subsequent analysis, while in others the software may run remotely (e.g., on the remote server (100)) and may receive captured images from the user site (102) and provide results.

As another example, this may include producing a set of position data indicating the position of at least a portion of the vehicle within the lift area, receiving a set of spatial characteristics that describe the physical dimensions of the lift area, associating the set of position data with the set of spatial characteristics to produce a virtualized position of the vehicle within the lift area, and determining the wheelbase measurement based on the virtualization position. The above example may further include identifying a front wheel and a rear wheel based on the set of position data and determining the wheelbase as the distance between the front wheel and the rear wheel based on the set of spatial characteristics. The above example may further include determining an offset of the vehicle from the safe lift position based on the virtualized position and providing a position warning when the offset exceeds a configured threshold.

Figure 8:
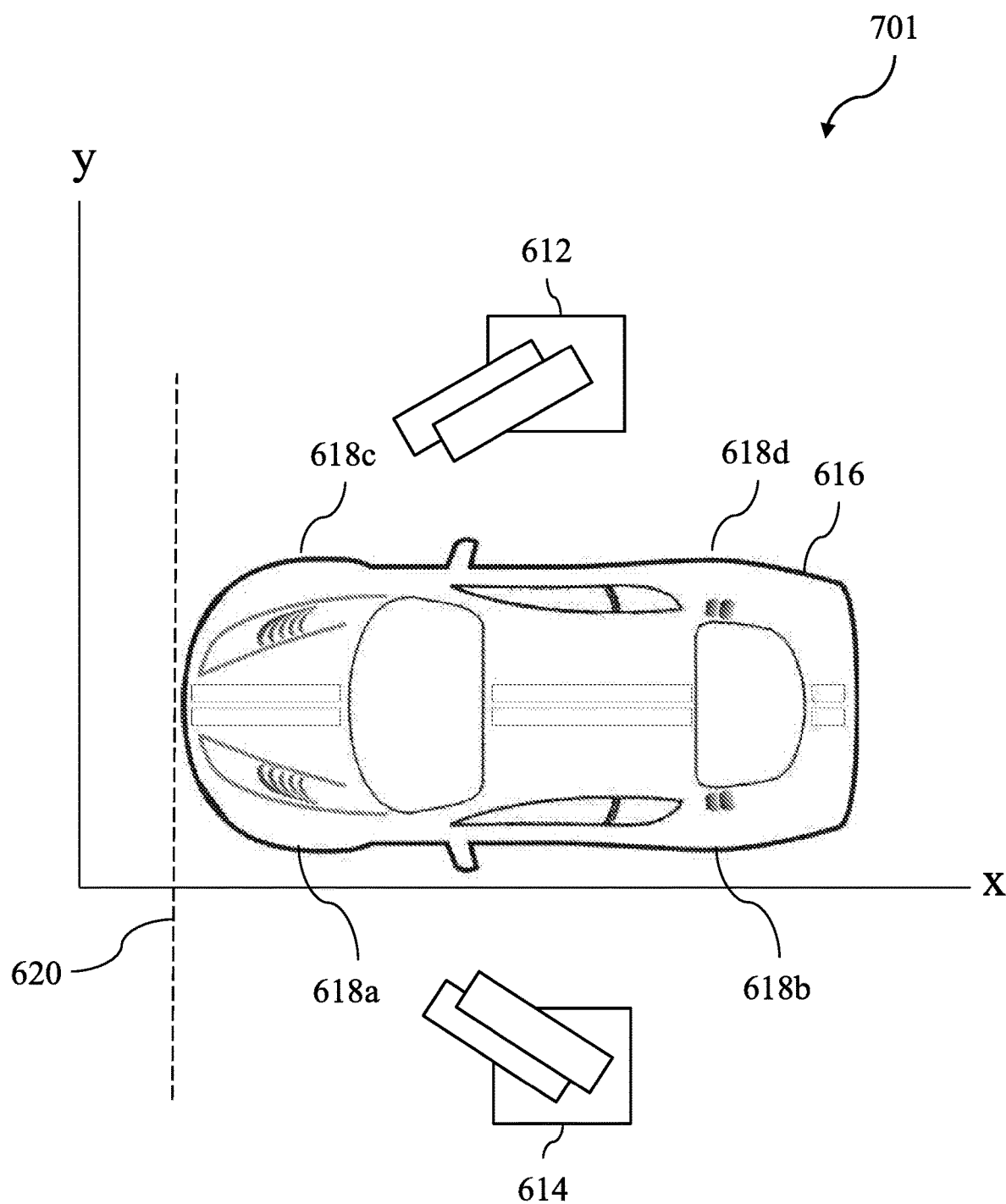
FIG. 8 is a schematic diagram showing a virtualized view of the vehicle lift and the vehicle during determination of the first relative position.

With a wheel identified (504) and confirmed (508, 510), the system may also set (516) a first relative position of the vehicle within the vehicle area (202) for purposes of determining and virtualizing vehicle (616) within the vehicle area (202). As an example, FIG. 8 shows a schematic diagram representing the virtualized view (701) of the vehicle lift area and the vehicle during determination of the first relative position (516). At this stage of virtualization, the system may know (e.g., be configured or calibrated with) the positions of a lift post (612) and a lift post (614), as well as the distance between the lift arms and the general dimensions of the vehicle lift area. The system may know that a vehicle (616) is within the lift area and, based upon identification (504) of one or more wheels, may know an approximate location of those wheels (618a, 618b, 618c, 618d). In some implementations, all of the wheels may be identified, while in others fewer than all of the wheels may be identified. For example, if the front driver side wheel (618a) is identified, and the lift system (114) has been configured with information identifying the vehicle (616) type and characteristics, it may be determined where the wheel (618a), the front of the vehicle (616), or both are located along an x-dimension relative to the lift posts (612, 614), as shown in FIG. 8. This x-dimension position (620) relative to the lift post (612, 614) is shown in FIG. 8 and is set (516) as the first relative position.

Figure 9:
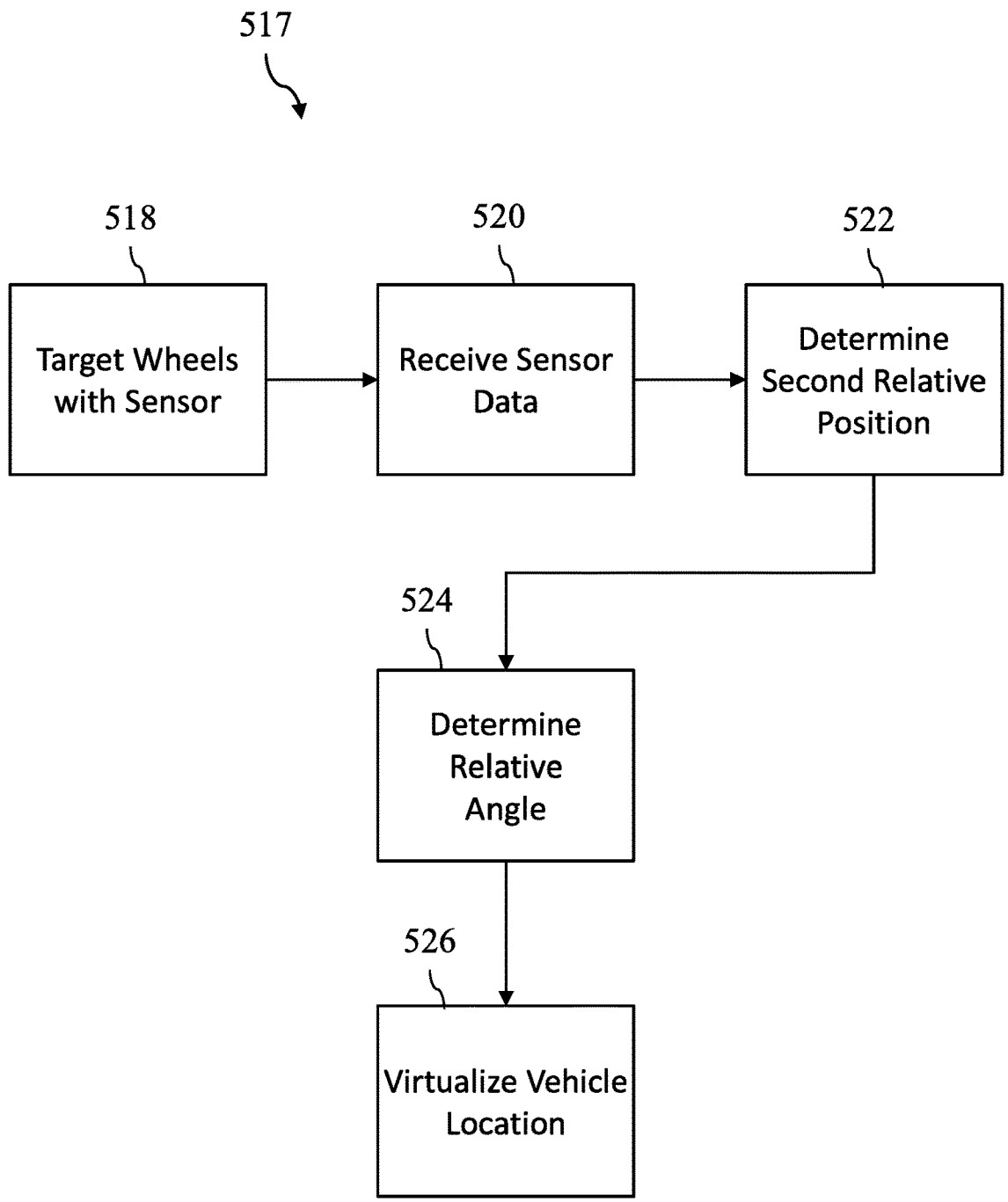
FIG. 9 is a flowchart of an exemplary set of steps that could be performed with the lift assistance system to determine a second relative position and a relative angle and position of vehicle in the latitudinal dimension relative to the lift structure.

With the first relative position (e.g., the x-direction position (620)), a set of steps (517) such as those shown in FIG. 9 may be performed to determine a second relative position (622) and a relative angle ($\theta$) of the centerline of the vehicle to the centerline of the vehicle area (118) (that centerline being the perpendicular bisector of a segment connecting lift posts (612, 614)) or another desired centerline as will occur to those skilled in the art. This may include targeting (518) one or more identified wheels or other surfaces of the vehicle with one or more sensors of the lift sensors (128) to determine their location in the y-dimension. Sensors and sensor technology used may include, for example, light detection and ranging ("lidar") or other optical or photoelectric sensing, ultrasonic proximity sensing, wireless triangulation, and other similar technologies that allow the direction and distance of an object to be detected. Such sensors may be statically mounted on one or both of the lift posts (612, 614) or elsewhere in the lift area, or they may be electronically adjustable such that they can be automatically targeted at wheels as they are identified.

Figure 10:
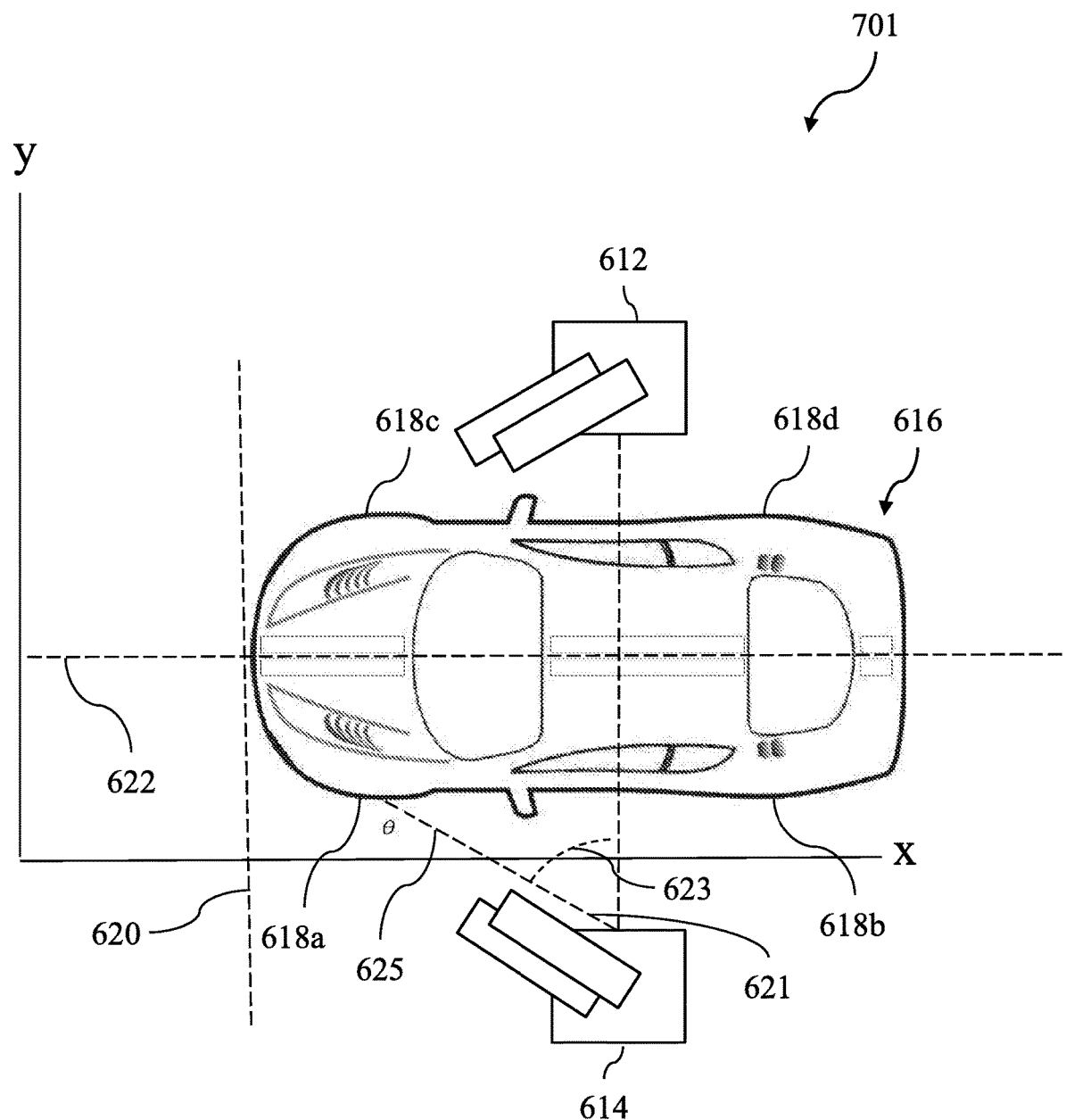
FIG. 10 is a schematic diagram showing a virtualized view of the vehicle lift and the vehicle during determination of the second relative position.
Figure 11:
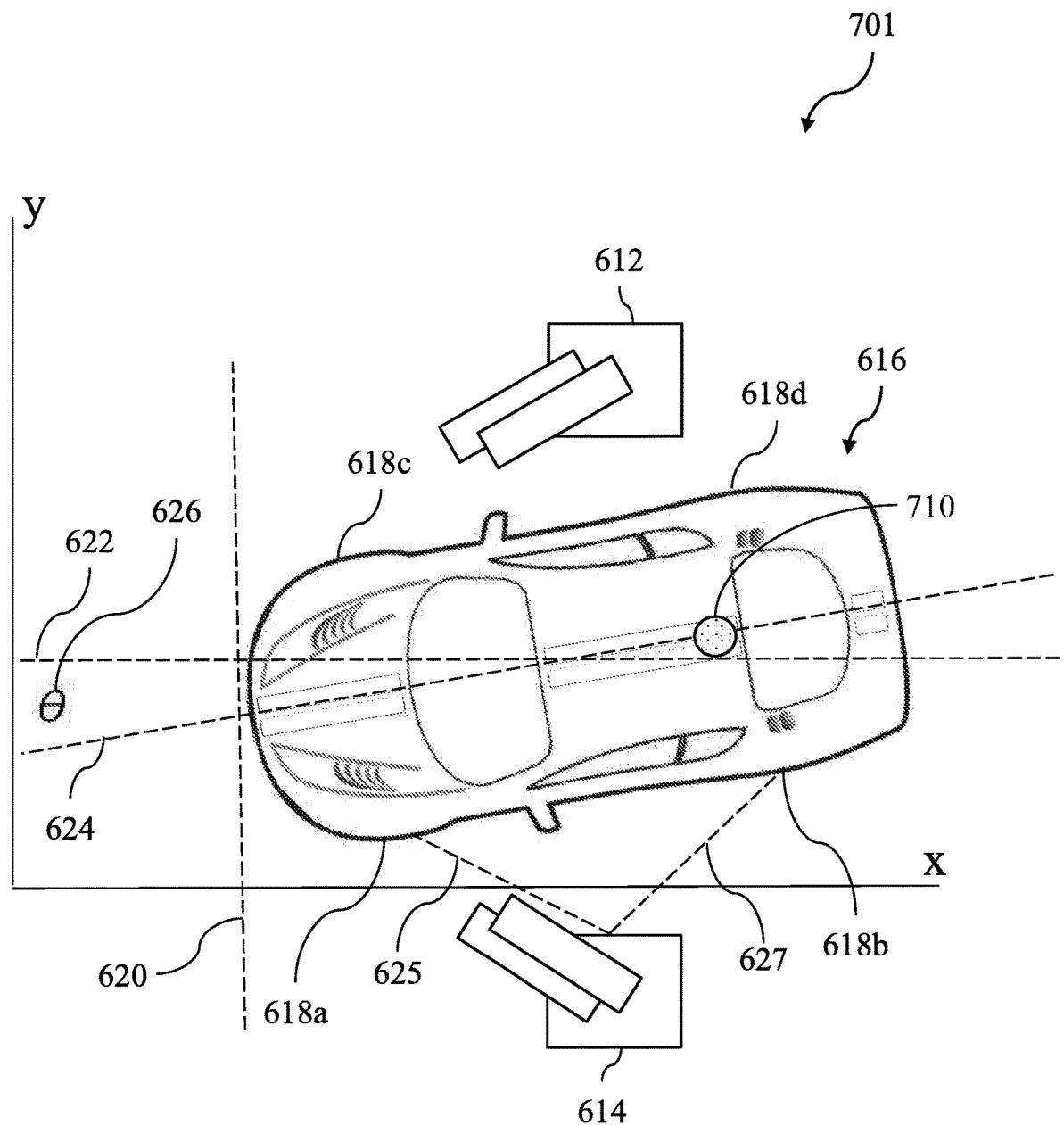
FIG. 11 is a schematic diagram showing a virtualized view of the vehicle lift and the vehicle during determination of the angle of the vehicle.

Sensor data may be received (520) and used to determine (522) a second relative position of the vehicle (616) (e.g., its position along the y-dimension) and to determine (524) a relative angle of the vehicle (616) (e.g., whether its longitudinal axis is rotated relative to the x-axis). With reference to FIG. 10, determination (522) of the vehicle's second relative position may be performed, for example, by using a sensor such as a lidar sensor or other sensor positioned on the lift post (614) to determine the distance (625) from the lift post (614) to the wheel (618a) based upon data generated by the lidar sensor from a sensing beam (621) and determining the angle (623) between the lidar sensor beam (621) and a line connecting the lift posts (612, 614). While FIGS. 10 and 11 show and describe lidar or another sensor being positioned at the lift post (614), it should be understood that the lift post (612) may be similarly configured. In such an implementation, lidar located at each lift post (612, 614) may be used to identify points of the vehicle (616) from each side of the vehicle rather than from a single side. This may advantageously provide more accurate information about the position and orientation of vehicle (616) and may also account for vehicles that may be damaged or modified such that standard specifications on width, length, and wheel placement do not accurately represent the vehicle in its current state.

Determination (522) of the y-direction position (622) may be performed as described above for one or more wheels (618a, 618b, 618c, 618d), though results may be more accurate if performed on at least two or more wheels (e.g., wheel 618a and wheel 618b or wheel 618b and wheel 618c). Determination (524) of the relative angle θ may be similarly performed by determining the distances (625, 627) between the lift post (614) and each of two or more wheels (e.g., wheel 618a and wheel 618b), as shown in FIG. 11, which along with information (e.g., such as the determined (306) wheelbase) may be used to virtualize the orientation (624) of the vehicle (616) within the lift area and angle (626) relative to the lift post (614). With the x-direction position (620), y-direction position (622), and orientation (624) known, the vehicle's location (i.e., position and orientation) within the vehicle lift area can be fully virtualized (526). Once virtualized (526), other aspects of the vehicle (616) may be incorporated to provide additional information to the system, such as where a vehicle has been configured or identified to the system by its make, model, VIN number, or other information, which can be used to identify standard information associated with the vehicle that may enrich the virtualization and verify its accuracy. Such additional information may include, for example, the known distance between wheels (e.g., between wheel 618a and wheel 618c, or between wheel 618a and wheel 618b), the length of the vehicle, the width of the vehicle, and the locations of standard lift points for the vehicle. Further, such information may include the determined (308) longitudinal center of gravity (710) for the vehicle (616), which may be virtualized as illustrated in FIG. 6.

As another example, virtualization may include producing a set of position data indicating the position of at least a portion of the vehicle within the lift area, receiving a set of spatial characteristics that describe the physical dimensions of the lift area, associating the set of position data with the set of spatial characteristics to produce a virtualized position of the vehicle within the lift area, and determining the wheelbase measurement based on the virtualization position. The above example may further include identifying a front wheel and a rear wheel based on the set of position data and determining the wheelbase as the distance between the front wheel and the rear wheel based on the set of spatial characteristics. The above example may further include determining an offset of the vehicle from the safe lift position based on the virtualized position and providing a position warning when the offset exceeds a configured threshold.

III. Exemplary Vehicle Positioning Guidance and Interface

Figure 12:
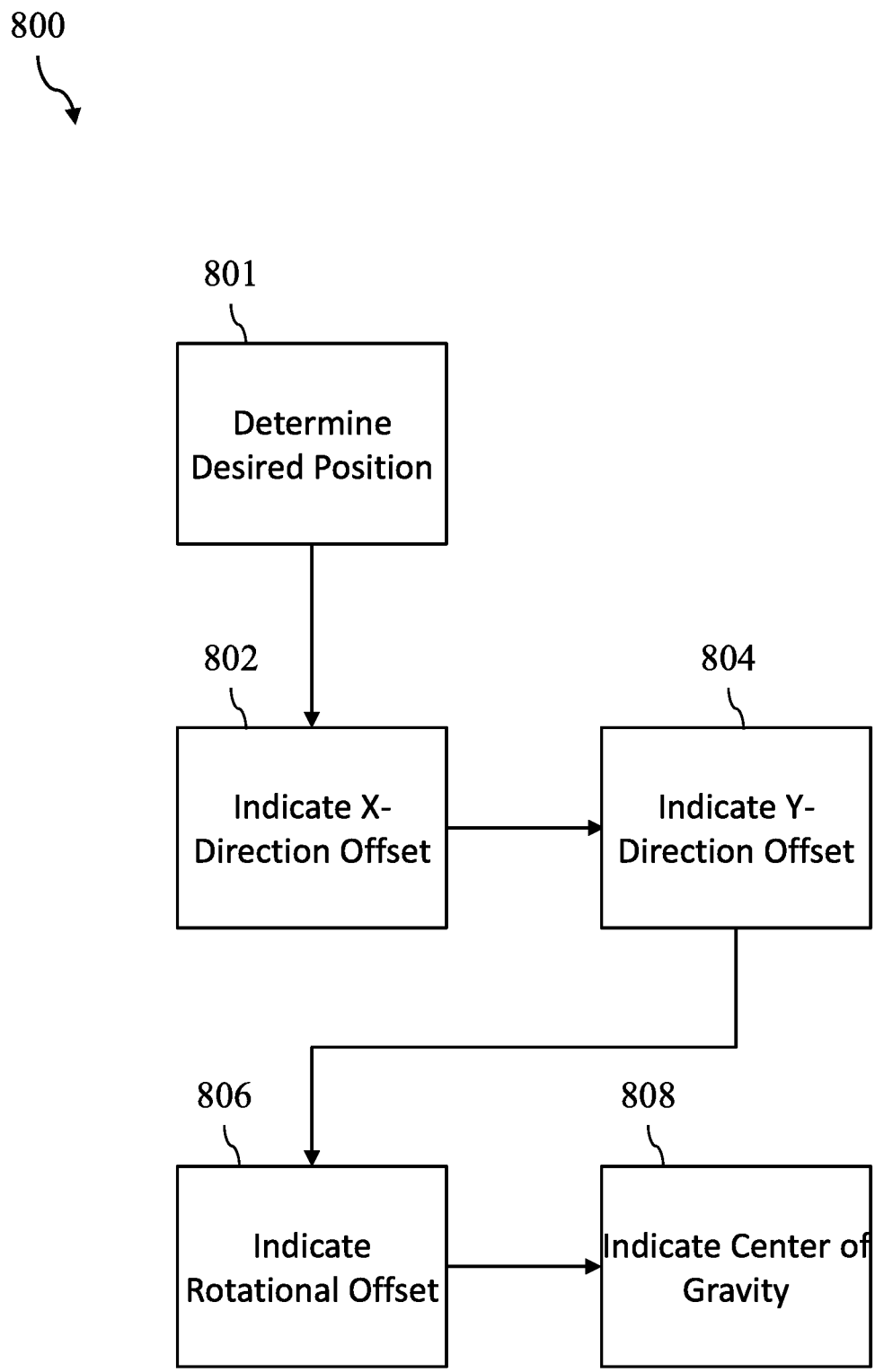
FIG. 12 is a flowchart of an exemplary set of steps that could be performed with the lift assistance system to provide guidance during vehicle positioning.

Information gathered about a vehicle during one or more of the virtualization steps described above may be used to aid in efficient and accurate positioning of the vehicle relative to the vehicle lift, which may reduce the need for repositioning, increase the speed of initial positioning, and increase the safety and stability of subsequent lifts. As an example, FIG. 12 shows a flowchart of an exemplary set of steps (800) that could be performed with the lift assistance system to provide guidance during vehicle positioning. With a vehicle's position and center of gravity virtualized and associated with real-world positions and measurements, such as shown in FIG. 11, a system such as the lift assistance system (10) may be configured to provide guidance in order to achieve a desired position relative to the lift. The desired position may be determined (801) based upon, for example, the lift type (e.g., the range of extension and rotation of lift members), vehicle type and characteristics (e.g., weight, overall length, overall width, location of lift points), and center of gravity (e.g., the determined (308) longitudinal center of gravity) may all influence the desired position.

With a desired vehicle position based on its actual center of gravity and a virtualized vehicle position, the system may determine and provide an indication of one or more changes in the vehicle position that may be made to place the vehicle at or within an acceptable position or area. With reference to FIG. 11, this may include indicating (802) an x-direction offset (e.g., whether the vehicle needs to be longitudinally repositioned relative to the lift posts), indicating (804) a y-direction offset (e.g., whether the vehicle needs to be latitudinally repositioned relative to the lift posts), and indicating (806) a rotational offset (e.g., whether the vehicle needs to be rotated to adjust its orientation (624)). This may also include indicating (808) the center of gravity of the vehicle, which may be useful to indicate why a vehicle position with respect to the lift posts may appear visually undesirable, and to provide assurance that it is a safe and stable lift position based upon the location of the center of gravity.

Figure 13:
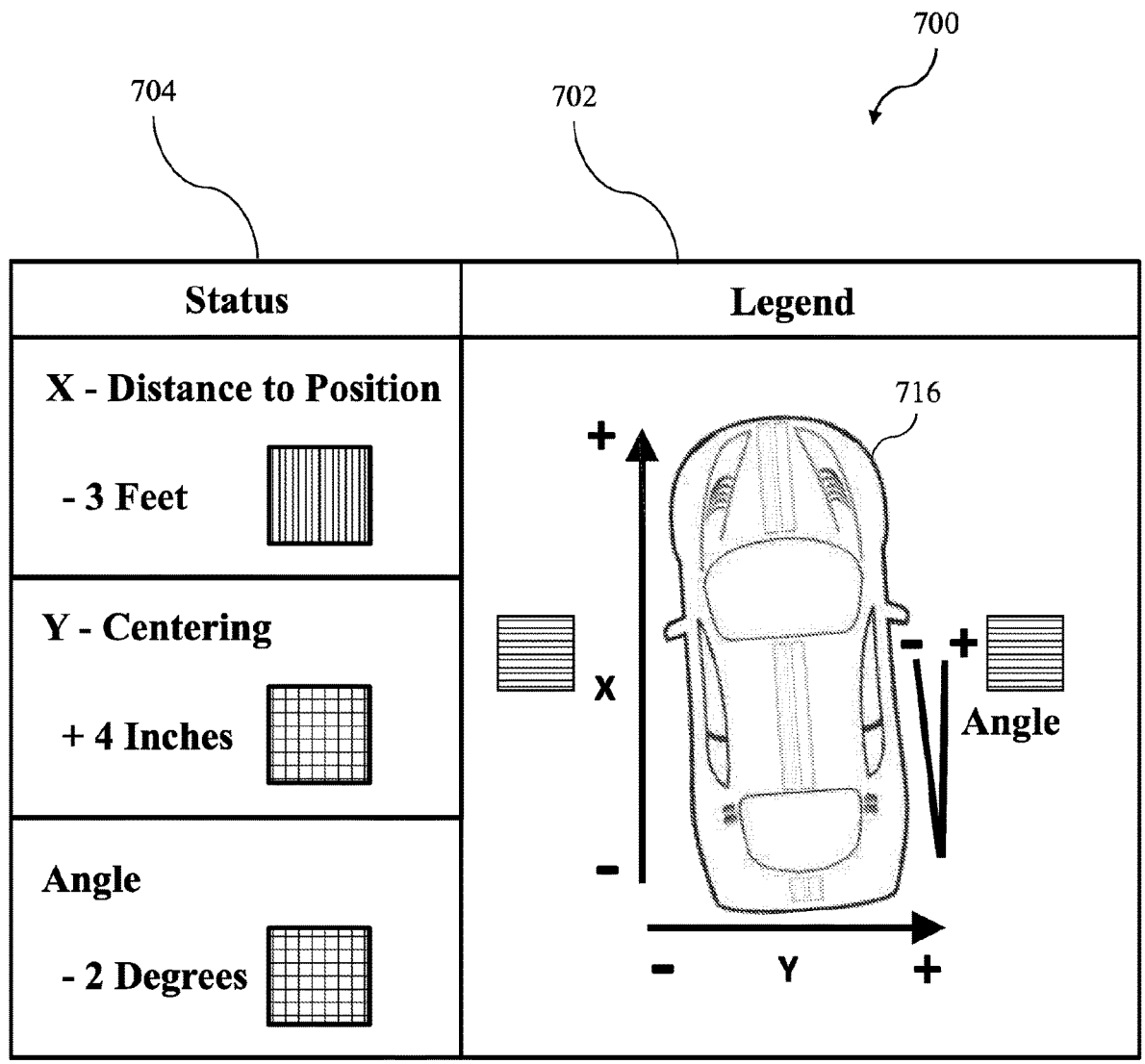
FIG. 13 is a simulated screenshot of a vehicle guide that may be displayed on a user device.

One or more of the indications described in FIG. 12 may be provided in various ways, including by the use of light indicators, audio indicators, or other devices. Such indications may also be provided by a user interface or graphical interface via a device such as the lift monitor device (110) and may be provided as a set of vehicle guide information. As an example, FIG. 13 shows a simulated screenshot of a vehicle guide interface (700) that may be displayed on a user device such as the lift monitor device (110) and that may be usable to aid in the positioning of a vehicle within the lift area. As can be seen, the vehicle guide interface (700) comprises a lift area legend shown as a legend window (702) that describes the virtualized position of a vehicle relative to the lift area and shows information similar to the virtualized view (e.g., position of lift posts, position of the vehicle with respect to the x-direction, y-direction, and rotation or orientation) that may be advantageous in allowing a user who is positioning the vehicle within the lift area to more efficiently and accurately reposition the vehicle if needed. A computer-generated rendering of vehicle (716) may also be displayed based upon the virtualized position of the vehicle within the lift area, and which may be updated as the vehicle is repositioned.

The vehicle guide interface (700) also comprises a status window (704) that shows other information associated with the virtualized view (701). This may include, for example, an x-direction offset from an ideal x-direction position as a number (e.g., 3 feet short of the ideal x-position indicating a need to pull the vehicle farther forward) or color (e.g., red, yellow, or green to indicate how close to ideal the vehicle is), a y-direction offset providing similar information, and an orientation or rotation offset providing an indication of whether the vehicle needs to be re-oriented between the lift posts. Ideal positions for x-direction, y-direction, and orientation may be configured manually, or may be automatically determined based upon available information such as the vehicle's overall length, width, weight, location of lift points, center of gravity, and other information as has been described, and as will be apparent to one of ordinary skill in the art in light of this disclosure.

Figure 14:
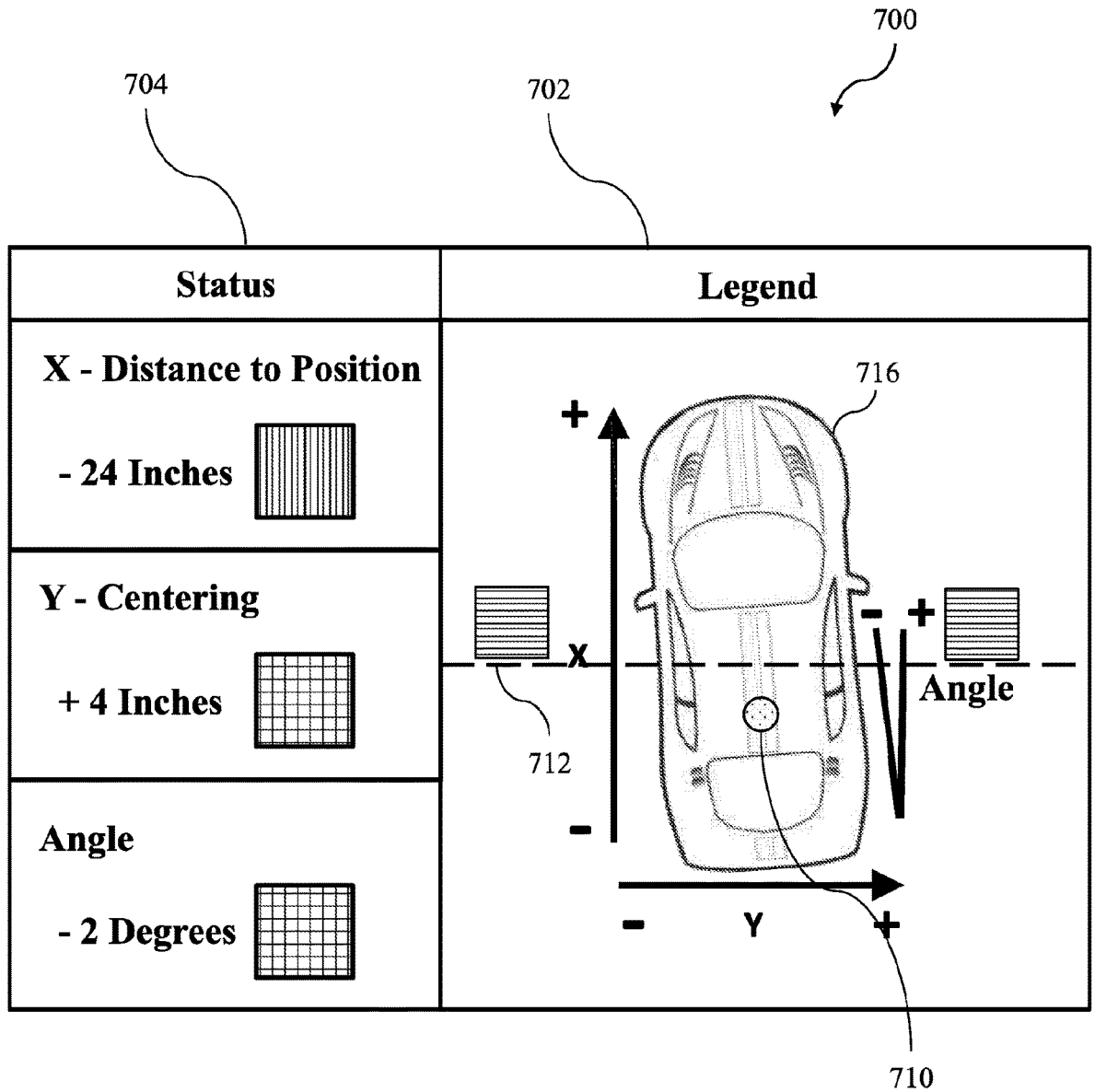
FIG. 14 is a simulated screenshot of the vehicle guide, with a center of gravity also displayed.
Figure 15:
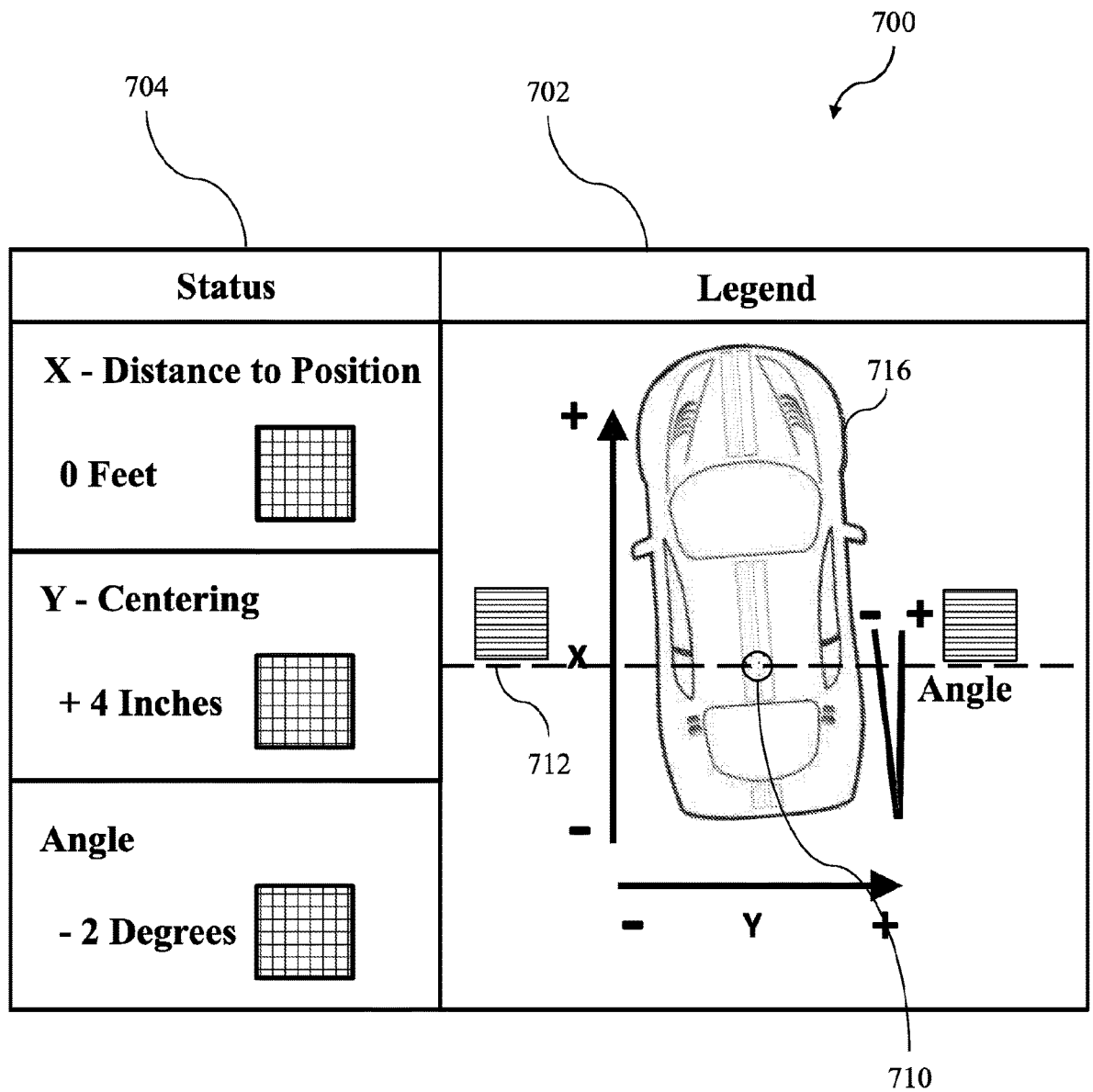
FIG. 15 is a simulated screenshot of the vehicle guide after a correction to account for the center of gravity.

With reference to FIG. 14, when the vehicle guide interface (700) is provided based upon the virtualized view (701), the determined (308) center of gravity (710) may also be displayed showing an indication of the longitudinal center of gravity, as well as a position indicator (712) showing a midline position of the lift, such as the midline (215). In such a case, the status window (704) may be updated to reflect the distance in the x-direction that the center of gravity (710) is offset from the ideal or desired position, which may be at or near the midline position indicator (712). With reference to FIG. 15, as the vehicle (616) is pulled forward and the vehicle guide interface (700) is updated based on new virtualization data, the center of gravity (710) may be displayed as moving towards the position indicator (712) or other desired or ideal position as the x-distance offset in the status window (704) approaches zero.

While FIGS. 14 and 15 show a center of gravity being determined only along the x-plane (e.g., the longitudinal center of gravity), it should be understood that some implementations may also determine and display the center of gravity along the x-plane and y-plane, as has been described above.

As will be apparent to one of ordinary skill in the art in light of this disclosure, the systems and methods described above for determining the center of gravity of a vehicle may be implemented in various ways, including as a standalone feature independent of the lift assistance system (10) and independent of the vehicle guide interface (700).

In variations of these embodiments, data created and/or used by the various systems and subsystems is stored in a network-accessible database, local database, virtual database, distributed database, cloud storage, flat file, or other object or device having the capability to receive, organize, store, and retrieve data. The data stored is more or less normalized, redundant, backed up, distributed, encrypted, and anonymized as will occur to those skilled in the art in view of the present disclosure.

Likewise, in variations of these embodiments, the determination of the location and orientation of the vehicle (616) in the vehicle area (118) takes a wide variety of forms as a function of design constraints and preferences. For example, the position and orientation of the vehicle (616) might be determined based on a single post-to-wheel distance measurement (e.g., distance (625)), a measured angle (e.g., angle (623)), and the known distance between the two wheels on the same side of the vehicle (616). Other calculations might take into account distance measurements, angle measurements, and/or video or sensor analysis, whether from each post (612, 614) or from other locations in or near the vehicle area (118) as will occur to those skilled in the art.

IV. Exemplary Combinations

The following non-exhaustive examples relate to various ways in which the teachings herein may be combined or applied. It should be understood that the following examples are not intended to restrict the coverage of any claims that may be presented at any time in this application or in subsequent filings related to this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A vehicle lift system comprising: a set of lift members operable to lift a vehicle within a lift area; a weight sensor configured to produce weight information for the vehicle when one or more wheels of the vehicle are positioned on the weight sensor; and a processor configured to: receive a set of weight data from the weight sensor; determine a wheelbase measurement associated with the vehicle; determine a longitudinal center of gravity for the vehicle based upon the set of weight data and the wheelbase measurement; determine a safe lift position for the vehicle within the lift area based upon the longitudinal center of gravity; and provide an indication of the safe lift position to a user.

Example 2

The vehicle lift system of example 1, wherein the set of lift members comprises a first lift post and a second lift post, and wherein each of the first lift post and the second lift post comprises a first arm and a second arm that are operable to extend and rotate.

Example 3

The vehicle lift system of any one or more of examples 1 through 2, wherein a weighing surface of the weight sensor is positioned proximately to the lift area and is adapted to: receive the front wheels of the vehicle and provide a front wheel load as part of the set of weight data; and receive the rear wheels of the vehicle and provide a rear wheel load as part of the set of weight data.

Example 4

The vehicle lift system of any one or more of examples 1 through 3, further comprising a lift controller, the lift controller comprising the processor.

Example 5

The vehicle lift system of any one or more of examples 1 through 4, wherein the set of weight data comprises a front wheel load and a rear wheel load, and wherein the processor is further configured, to, when determining the longitudinal center of gravity: determine a proportion of the front wheel load to the vehicle's total weight; determine a front wheel offset based on the proportion and the wheelbase measurement; and determine the longitudinal center of gravity based on the front wheel offset.

Example 6

The vehicle lift system of any one or more of examples 1 through 5, wherein the set of weight data comprises a right wheel load and a left wheel load, and wherein the processor is further configured to, when determining the latitudinal center of gravity: determine a proportion of the right wheel load to the vehicle's total weight; determine a right wheel offset based on the proportion and a vehicle width measurement; and determine the latitudinal center of gravity based on the right wheel offset.

Example 7

The vehicle lift system of any one or more of examples 1 through 6, further comprising a set of lift area detectors configured to produce a set of position data indicating the position of at least a portion of the vehicle within the lift area, wherein the processor is further configured to: receive a set of spatial characteristics, wherein the set of spatial characteristics is configured to describe the physical dimensions of the lift area; associate the set of position data with the set of spatial characteristics to produce a virtualized position of the vehicle within the lift area; and determine the wheelbase measurement based on the virtualized position.

Example 8

The vehicle lift system of example 7, wherein the processor is further configured to: identify a front wheel and a rear wheel of the vehicle based on the set of position data; and determine the wheelbase as the distance between the front wheel and the rear wheel based on the set of spatial characteristics.

Example 9

The vehicle lift system of any one or more of examples 7 through 8, wherein the processor is further configured, when providing the indication of the lift position to the user, to: determine an offset of the vehicle from the safe lift position based on the virtualized position; and provide a position warning when the offset exceeds a configured threshold.

Example 10

The vehicle lift system of any one or more of examples 7 through 9, wherein the processor is further configured to provide a set of vehicle guide information to a monitor device that is communicatively coupled with the processor, wherein the set of vehicle guide information is configured to cause the monitor device to: display a lift area legend window that describes the virtualized position of the vehicle relative to the lift area; and display a status window that describes the virtualized position of the vehicle relative to the safe lift position.

Example 11

The vehicle lift system of example 10, wherein the set of vehicle guide information is further configured to cause the monitor device to display an indication of the longitudinal center of gravity.

Example 12

The vehicle lift system of example 11, wherein the set of vehicle guide information is further configured to cause the monitor device to display an indication of a midline of the lift area relative to the longitudinal center of gravity.

Example 13

The vehicle lift system of any one or more of examples 1 through 12, wherein the processor is further configured to provide the indication of the safe lift position as one or more of: a visual indicator via a light indicator; an audio indicator via a speaker; and a graphical user interface via a monitor device.

Example 14

The vehicle lift system of any one or more of examples 1 through 13, wherein the processor is further configured to: receive a historic longitudinal center of gravity associated with the vehicle from a remote server; compare the historic longitudinal center of gravity with the determined longitudinal center of gravity; and provide a vehicle update to the remote server, wherein the vehicle update describes the determined longitudinal center of gravity and the vehicle.

Example 15

The vehicle lift system of any one or more of examples 1 through 14, wherein the processor is further configured to: receive a confirmation from the user confirming that the vehicle is positioned at the safe lift position and that the safe lift position accounts for the longitudinal center of gravity; and enable operation of the set of lift members in response to the confirmation.

Example 16

A method for positioning a vehicle with dynamic center of gravity measurement comprising: positioning a set of front wheels of the vehicle on a weight sensor that is configured to produce weight information; repositioning the vehicle to position a set of rear wheels of the vehicle on the weight sensor; receiving a set of weight data from the weight sensor, the set of weight data comprising a front wheel load and a rear wheel load; determining a wheelbase measurement for the vehicle; determining a longitudinal center of gravity for the vehicle based upon the set of weight data and the wheelbase measurement; determining a safe lift position for the vehicle within a lift area based upon the longitudinal center of gravity; and providing an indication of the vehicle's current position within the lift area relative to the safe lift position.

Example 17

The method of example 16, wherein the weight sensor is proximate to the lift area, further comprising: moving the vehicle forward to position the set of front wheels on the weight sensor; after receiving the front wheel load, moving the vehicle forward to position the set of rear wheels on the weight sensor; and moving the vehicle forward into the lift area and, after receiving the indication of the vehicle's current position relative to the safe lift position, positioning the vehicle at the safe lift position.

Example 18

The method of any one or more of examples 16 through 17, further comprising: receiving a set of position data from a set of lift area detectors, the set of position data indicating the position of at least a portion of the vehicle within the lift area; receiving a set of spatial characteristics, wherein the set of spatial characteristics is configured to describe the physical dimensions of the lift area; associating the set of position data with the set of spatial characteristics to produce a virtualized position of the vehicle within the lift area; and determining the wheelbase measurement based on the virtualized position.

Example 19

The method of example 18, further comprising: displaying, via a monitor device, a lift area legend window that describes the virtualized position of the vehicle relative to the lift area; displaying a status window that describes the virtualized position of the vehicle relative to the safe lift position; and displaying an indication of the longitudinal center of gravity of the vehicle.

Example 20

The method of any one or more of examples 16 through 19, further comprising: receiving a confirmation from a user confirming that the vehicle is positioned at the safe lift position and that the safe lift position accounts for the longitudinal center of gravity; and in response to the confirmation, enabling operation of a set of lift members that are operable to raise the vehicle within the lift area.

Example 21

A system comprising: a weight sensor configured to produce a set of weight data for a vehicle, the weight sensor adapted to: receive the front wheels of the vehicle and provide a front wheel load as part of the set of weight data; and receive the rear wheels of the vehicle and provide a rear wheel load as part of the set of weight data; a camera configured to capture image data of the vehicle from a first position; a remote lift processor configured to: receive image data from the camera and identify a front wheel and a rear wheel based on the image data; determine a wheelbase measurement between the front wheel and the rear wheel based upon a set of configured spatial characteristics that are associated with the camera at the first position; determine a center of gravity dataset for the vehicle based upon the set of weight data and the wheelbase measurement; and provide the center of gravity dataset to a local lift processor, wherein the center of gravity dataset is usable by the local lift processor to determine a safe lift position for the vehicle within a lift area associated with the local lift processor.

It should be understood that any one or more of the teachings, expressions, embodiments, examples, etc. described herein may be combined with any one or more of the other teachings, expressions, embodiments, examples, etc. that are described herein. The teachings, expressions, embodiments, examples, etc. herein should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A vehicle lift system comprising:
 (a) a set of lift members operable to lift a vehicle within a lift area;
 (b) a weight sensor configured to produce weight information for the vehicle when one or more wheels of the vehicle are positioned on the weight sensor; and
 (c) a processor configured to:
  (i) receive a set of weight data from the weight sensor; and
  (ii) provide to a user an indication of a safe lift position, where the safe lift position is in the lift area and is based on the set of weight data and a wheelbase measurement associated with the vehicle.

2. The vehicle lift system of claim 1, wherein the set of lift members comprises a first lift post and a second lift post, and wherein each of the first lift post and the second lift post comprises a first arm and a second arm that are operable to extend horizontally and rotate about a vertical axis.

3. The vehicle lift system of claim 1, wherein a weighing surface of the weight sensor is positioned proximately to the lift area and is adapted to:
 (a) receive the front wheels of the vehicle and provide a front wheel load as part of the set of weight data; and
 (b) receive the rear wheels of the vehicle and provide a rear wheel load as part of the set of weight data.

4. The vehicle lift system of claim 1, further comprising a lift controller, the lift controller comprising the processor.

5. The vehicle lift system of claim 1, wherein the set of weight data comprises a front wheel load and a rear wheel load, and wherein the safe lift position is also a function of a front wheel offset calculated based on the wheelbase measurement and a proportion of the front wheel load to the vehicle's total weight.

6. The vehicle lift system of claim 1, wherein the set of weight data comprises a right wheel load and a left wheel load, and wherein the safe lift position is also a function of a right wheel offset calculated based on a vehicle width measurement and a proportion of the right wheel load to the vehicle's total weight.

7. The vehicle lift system of claim 1, further comprising a set of lift area detectors configured to produce a set of position data indicating the position of at least a portion of the vehicle within the lift area, wherein the processor is further configured to:
 (a) receive a set of spatial characteristics, wherein the set of spatial characteristics describes the physical dimensions of the lift area;
 (b) produce a virtualized position of the vehicle within the lift area based on the set of position data and the set of spatial characteristics; and
 (c) determine the wheelbase measurement based on the virtualized position.

8. The vehicle lift system of claim 7, wherein the processor is further configured to:
 (a) identify a front wheel and a rear wheel of the vehicle based on the set of position data; and
 (b) determine the wheelbase measurement as the distance between the front wheel and the rear wheel based on the set of spatial characteristics.

9. The vehicle lift system of claim 7, wherein the processor is further configured to, when providing the indication of the lift position to the user:
 (a) determine an offset of the vehicle from the safe lift position based on the virtualized position; and
 (b) provide a position warning when the offset exceeds a configured threshold.

10. The vehicle lift system of claim 7, wherein the processor is further configured to provide a set of vehicle guide information to a monitor device that is communicatively coupled with the processor, wherein the set of vehicle guide information is configured to cause the monitor device to:

(a) display a lift area legend window that describes the virtualized position of the vehicle relative to the lift area; and
(b) display a status window that describes the virtualized position of the vehicle relative to the safe lift position.

11. The vehicle lift system of claim 10, wherein the set of vehicle guide information is further configured to cause the monitor device to display an indication of the longitudinal center of gravity.

12. The vehicle lift system of claim 11, wherein the set of vehicle guide information is further configured to cause the monitor device to display an indication of a midline of the lift area relative to a longitudinal center of gravity that is determined based on the set of wheel data and the wheelbase measurement.

13. The vehicle lift system of claim 1, wherein the processor is further configured to provide the indication of the safe lift position as one or more of:
(a) a visual indicator via a light indicator;
(b) an audio indicator via a speaker; and
(c) a graphical user interface via a monitor device.

14. The vehicle lift system of claim 1, wherein the processor is further configured to:
(a) receive from a remote server a historic longitudinal center of gravity associated with the vehicle;
(b) compare the historic longitudinal center of gravity with a longitudinal center of gravity that is determined based on the set of wheel data and the wheelbase measurement; and
(c) provide a vehicle update to the remote server, wherein the vehicle update describes the determined longitudinal center of gravity and the vehicle.

15. The vehicle lift system of claim 1, wherein the processor is further configured to:
(a) receive a confirmation from the user confirming that the vehicle is positioned at the safe lift position and that the safe lift position accounts for a longitudinal center of gravity that is determined based on the set of wheel data and the wheelbase measurement; and
(b) enable operation of the set of lift members in response to the confirmation.

16. A method for positioning a vehicle with dynamic center of gravity measurement, comprising the steps of:
(a) positioning a set of front wheels of the vehicle on one or more weight sensors, where the one or more weight sensors are configured to produce weight information;
(b) positioning a set of rear wheels of the vehicle on the one or more weight sensors;
(c) receiving a set of weight data from the one or more weight sensors, the set of weight data comprising a front wheel load and a rear wheel load;
(d) determining a wheelbase measurement for the vehicle;
(e) determining a safe lift position for the vehicle within a lift area based upon the set of weight data and the wheelbase measurement; and
(f) providing an indication of the vehicle's current position within the lift area relative to the safe lift position.

17. The method of claim 16, wherein the weight sensor is proximate to the lift area, further comprising:
(a) pulling the vehicle forward to position the set of front wheels on the one or more weight sensors;
(b) after receiving the front wheel load, pulling the vehicle forward to position the set of rear wheels on the one or more weight sensors; and
(c) pulling the vehicle forward into the lift area and, after receiving the indication of the vehicle's current position relative to the safe lift position, positioning the vehicle at the safe lift position.

18. The method of claim 16, further comprising:
(a) producing a virtualized position of the vehicle within the lift area based on a set of position data and a set of spatial characteristics, wherein the set of position data indicates the position of at least a portion of the vehicle within the lift area, and wherein the set of spatial characteristics characterize one or more physical dimensions of the lift area; and
(b) determining the wheelbase measurement based on the virtualized position.

19. The method of claim 18, further comprising:
(a) displaying, via a monitor device, a lift area legend window that describes the virtualized position of the vehicle relative to the lift area;
(b) displaying, via the monitor device, a status window that describes the virtualized position of the vehicle relative to the safe lift position; and
(c) displaying, via the monitor device, an indication of a longitudinal center of gravity for the vehicle, wherein the longitudinal center of gravity of the vehicle is determined based upon the set of weight data and the wheelbase measurement.

20. The method of claim 16, further comprising:
(a) receiving a confirmation from a user confirming that the vehicle is positioned at the safe lift position and that the safe lift position accounts for a longitudinal center of gravity for the vehicle, wherein the longitudinal center of gravity is determined based upon the set of weight data and the wheelbase measurement; and
(b) in response to the confirmation, enabling operation of a set of lift members that are operable to raise the vehicle within the lift area.

21. A system comprising:
(a) a weight sensor configured to:
(i) receive front wheels of a vehicle; and
(ii) receive rear wheels of the vehicle; and
(iii) produce a set of weight data for the vehicle, the set of weight data comprising a front wheel load and a rear wheel load;
(b) a camera configured to capture image data of the vehicle from a first position; and
(c) a remote lift processor configured to:
(i) receive image data from the camera and identify a front wheel and a rear wheel based on the image data;
(ii) determine a wheelbase measurement between the front wheel and the rear wheel based upon a set of configured spatial characteristics that are associated with the camera at the first position;
(iii) determine a center of gravity dataset for the vehicle based upon the set of weight data and the wheelbase measurement; and
(iv) provide the center of gravity dataset to a local lift processor, wherein the center of gravity dataset is usable by the local lift processor to determine a safe lift position for the vehicle within a lift area associated with the local lift processor.

* * * * *